United States Patent
Chen

(10) Patent No.: US 12,092,727 B2
(45) Date of Patent: *Sep. 17, 2024

(54) MERGE-SPLIT TECHNIQUES FOR SENSOR DATA FILTERING

(71) Applicant: Motional AD LLC, Boston, MA (US)

(72) Inventor: Lingji Chen, Acton, MA (US)

(73) Assignee: Motional AD LLC, Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/154,677

(22) Filed: Jan. 13, 2023

(65) Prior Publication Data

US 2023/0333237 A1    Oct. 19, 2023

Related U.S. Application Data

(63) Continuation of application No. 16/942,703, filed on Jul. 29, 2020, now Pat. No. 11,555,910.
(Continued)

(51) Int. Cl.
*G01S 13/72* (2006.01)
*G01S 13/931* (2020.01)
*G08G 1/16* (2006.01)

(52) U.S. Cl.
CPC .......... *G01S 13/723* (2013.01); *G01S 13/931* (2013.01); *G08G 1/166* (2013.01); *G01S 13/726* (2013.01);
(Continued)

(58) Field of Classification Search
CPC .... G01S 13/723; G01S 13/931; G01S 13/726; G01S 2013/9323; G01S 2013/9324; G08G 1/166

See application file for complete search history.

(56) References Cited

U.S. PATENT DOCUMENTS

| | | | |
|---|---|---|---|
| 5,414,643 A * | 5/1995 | Blackman | G01S 13/726 342/95 |
| 7,590,262 B2 | 9/2009 | Fujimura et al. | |
| 8,970,429 B2 * | 3/2015 | Pickle | G01S 13/888 342/95 |

(Continued)

FOREIGN PATENT DOCUMENTS

| | | |
|---|---|---|
| EP | 2498470 A1 | 9/2012 |
| JP | 2001-337162 A | 12/2001 |

(Continued)

OTHER PUBLICATIONS

Z. Khan, T. Balch and F. Dellaert, "Multitarget tracking with split and merged measurements," 2005 IEEE Computer Society Conference on Computer Vision and Pattern Recognition (CVPR'05), San Diego, CA, USA, 2005, pp. 605-610 vol. 1, doi: 10.1109/CVPR. 2005.245. (Year: 2005).*

(Continued)

*Primary Examiner* — Matthew M Barker
(74) *Attorney, Agent, or Firm* — Knobbe, Martens, Olson & Bear, LLP

(57) ABSTRACT

A technique for tracking objects includes: determining a set of detected measurements based on a received return signal; determining a group that includes a set of group measurements and a set of group tracks; creating a merged factor, including a merged set of track state hypotheses associated with a merged set of existing tracks including a first set of existing tracks and a second set of existing tracks, by calculating the cross-product of a first set of previous track state hypotheses and a second set of previous track state hypotheses; determining a first new factor and a second new factor; calculating a first set of new track state hypotheses for the first new factor based on a first subset of the group measurements; and calculating a second set of new track state hypotheses for the second new factor based on a second subset of the group measurements.

20 Claims, 19 Drawing Sheets

Related U.S. Application Data

(60) Provisional application No. 62/882,336, filed on Aug. 2, 2019.

(52) U.S. Cl.
CPC ............... *G01S 2013/9323* (2020.01); *G01S 2013/9324* (2020.01)

(56) References Cited

U.S. PATENT DOCUMENTS

| | | | |
|---|---|---|---|
| 9,405,970 | B2 | 8/2016 | Israel et al. |
| 11,073,608 | B2* | 7/2021 | Ng .................... G01S 7/282 |
| 11,555,910 | B2 | 1/2023 | Chen |
| 2008/0130949 | A1 | 6/2008 | Ivanov et al. |
| 2010/0013935 | A1* | 1/2010 | Ma .................... G06V 10/24 348/169 |
| 2014/0321704 | A1 | 10/2014 | Partis |
| 2020/0377086 | A1* | 12/2020 | Reuter .................. B60W 30/09 |

FOREIGN PATENT DOCUMENTS

| | | |
|---|---|---|
| JP | 2002-139566 A | 5/2002 |
| WO | WO 2007/033286 A2 | 3/2007 |
| WO | WO 2014/011288 A2 | 1/2014 |

OTHER PUBLICATIONS

Ma, Y., Yu, Q., Cohen, I. (2006). Multiple Hypothesis Target Tracking Using Merge and Split of Graph's Nodes. In: Bebis, G., et al. Advances in Visual Computing. ISVC 2006. Lecture Notes in Computer Science, vol. 4291. Springer, Berlin, Heidelberg. https://doi.org/10.1007/11919476_78 (Year: 2006).*

"K shortest path routing", Wikipedia, last edited Oct. 14, 2021 (accessed Nov. 17, 2021), in 3 pages. URL: https://en.wikipedia.org/wiki/K_shortest_path_routing.

Beard, M. et al., "A Solution for Large-scale Multi-object Tracking", ArXiv e-prints, Apr. 2018, in 17 pages.

Blom, H.A.P et al., "The interacting multiple model algorithm for systems with Markovian switching coefficients", IEEE Transactions on Automatic Control, Aug. 1988, vol. 33(8), pp. 780-783.

Dezert, J. et al., "Joint probabilistic data association for autonomous navigation", IEEE Transactions on Aerospace and Electronic Systems, Oct. 1993, vol. 29(4), pp. 1275-1286.

Fantacci, C. et al., "Scalable Multisensor Multitarget Tracking Using the Marginalized delta-GLMB Density," IEEE Signal Processing Letters, Jun. 2016, vol. 23(6), pp. 863-867.

Rong Li, X. et al., "Survey of maneuvering target tracking. Part V: Multiple-model methods", IEEE Transactions on Aerospace and Electronic Systems, Oct. 2005, vol. 41(4), pp. 1255-1321.

Mahler, R., "Multitarget Bayes filtering via first-order multitarget moments", IEEE Transactions on Aerospace and Electronic Systems, Oct. 2003, vol. 39(4), pp. 1152-1178.

Mahler, R., "PHD filters of higher order in target number", IEEE Transactions on Aerospace and Electronics Systems, Oct. 2007, vol. 43(4), pp. 1523-1543.

Mahler, R. "Chapter 16—Random Set Theory for Multisource-Multitarget Information Fusion", *Handbook of Multisensor Data Fusion*, Eds., David L. Hall and James Llinas, CRC Press, 2nd edition, Sep. 2008, pp. 369-410.

Punchihewa, Y. et al., "A Generalized Labeled Multi-Bernoulli Filter for Maneuvering Targets", Cornell University, arXivLabs, Mar. 2016, in 7 pages. URL: https://arxiv.org/abs/1603.04565.

Reuter, S. et al., "The Labeled Multi-Bernoulli Filter," IEEE Transactions on Signal Processing, Jun. 2014, vol. 62(12), pp. 3246-3260.

SAE On-Road Automated Vehicle Standards Committee, "SAE International's Standard J3016: Taxonomy and Definitions for Terms Related to Driving Automation Systems for On-Road Motor Vehicles", Jun. 2018, in 35 pages.

Vo, B.N. et al., "An Efficient Implementation of the Generalized Labeled Multi-Bernoulli Filter," IEEE Transactions on Signal Processing, Apr. 2017, vol. 65, No. 8, pp. 1975-1987.

Vo, B.N. et al., "Sequential Monte Carlo methods for Multi-target Filtering with Random Finite Sets", IEEE Transactions on Aerospace and Electronic Systems, Jun. 2005, pp. 1224-1245.

Chinese Office Action issued for Application No. CN 202010766618.4 dated Jan. 4, 2024.

Great Britain Office Action issued for Application No. GB 2011932.7, dated Mar. 31, 2021.

Great Britain Office Action issued for Application No. GB 2011932.7, dated Jan. 20, 2023.

Korean Grant of Patent issued for Application No. 10-2020-0096936, dated May 28, 2021.

* cited by examiner

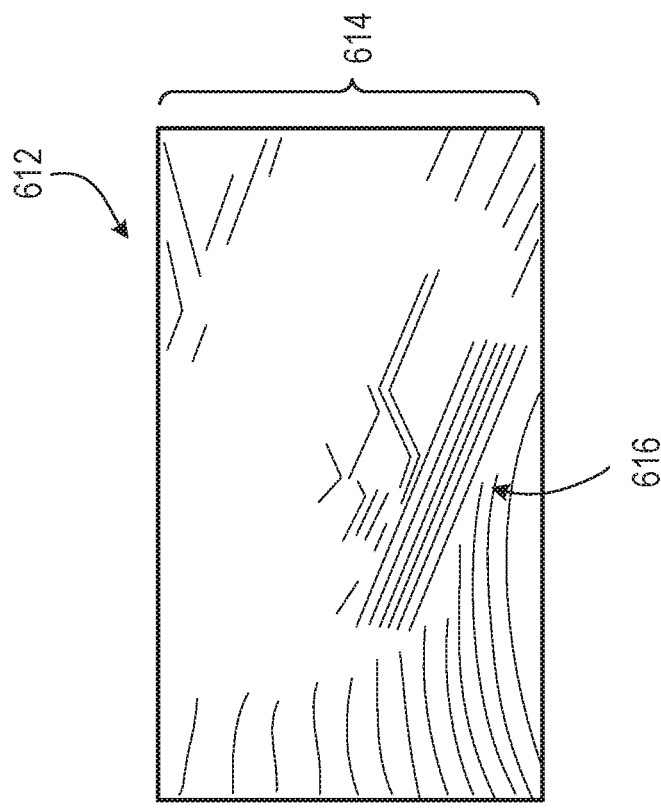
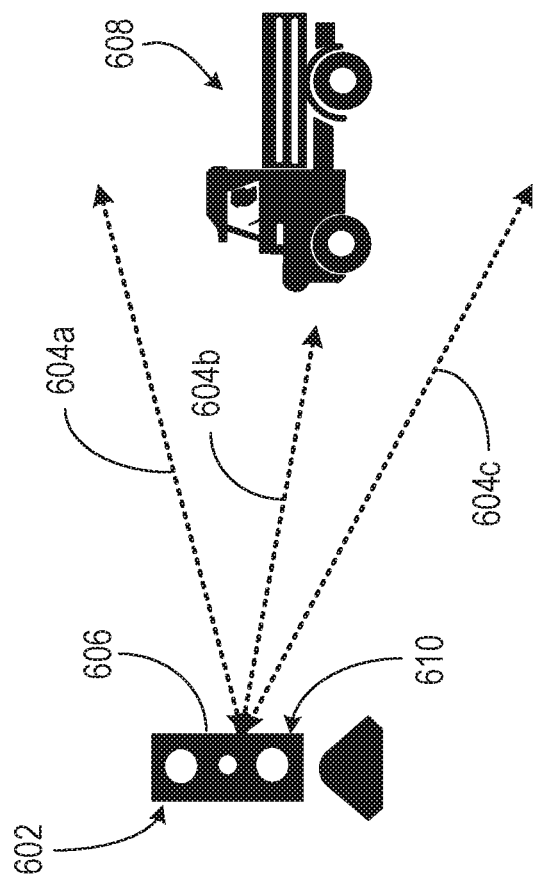
FIG. 6

| P(A,B) | $b_1$ | $b_2$ |
|---|---|---|
| $a_1$ | 0.1 | 0.2 |
| $a_2$ | 0.2 | 0.3 |
| $a_3$ | 0.05 | 0.15 |

FIG. 14A

| A | P(A) |
|---|---|
| $a_1$ | 0.3 |
| $a_2$ | 0.5 |
| $a_3$ | 0.2 |

| B | $b_1$ | $b_2$ |
|---|---|---|
| P(B) | 0.35 | 0.65 |

FIG. 14B

| P(A)P(B) | $b_1$ | $b_2$ |
|---|---|---|
| $a_1$ | 0.105 | 0.195 |
| $a_2$ | 0.175 | 0.325 |
| $a_3$ | 0.07 | 0.13 |

FIG. 14C

MERGE-SPLIT TECHNIQUES FOR SENSOR DATA FILTERING

CROSS-REFERENCE TO RELATED APPLICATIONS

This application is a continuation of U.S. application Ser. No. 16/942,703, filed Jul. 29, 2020, which claims the benefit of U.S. Provisional Application No. 62/882,336, filed Aug. 2, 2019, entitled "MERGE-SPLIT TECHNIQUES FOR SENSOR DATA FILTERING," the entire contents of each of which are hereby incorporated by reference.

FIELD

This description relates to a system for filtering sensor data to track objects, and in particular to tracking one or more objects in the environment surrounding an autonomous vehicle by merging and splitting track state hypotheses.

BACKGROUND

Autonomous vehicles can be used to transport people and/or cargo (e.g., packages, objects, or other items) from one location to another. For example, an autonomous vehicle can navigate to the location of a person, wait for the person to board the autonomous vehicle, and navigate to a specified destination (e.g., a location selected by the person). To navigate in the environment, these autonomous vehicles are equipped with various types of sensors to detect objects in the surroundings.

SUMMARY

The subject matter described in this specification is directed to a computer system and techniques for detecting objects in an environment surrounding an autonomous vehicle. Generally, the computer system is configured to receive input from one or more sensors of the vehicle, detect one or more objects in the environment surrounding the vehicle based on the received input, and form and update track information based upon the detection of the objects.

Tracking is a challenging problem because targets can move and vary in number. Also, the measurements from the sensors have noise and uncertain origins. The single target filtering problem has a Bayesian solution in a recursive form. To generalize to the multi-target case, the Random Finite Set framework can be used.

One approach for filtering sensor data and tracking objects includes merging sets of existing track state hypotheses (the sets of track state hypotheses are referred to herein as "factors") and then, prior to updating the track state hypotheses with newly collected sensor data (e.g., before calculating new track state hypotheses), splitting the merged set (e.g., the merged factor) into two or more new sets of hypotheses (e.g., new factors). Splitting the merged factor allows some tracks to be treated as independent of other tracks for the purpose of updating the hypotheses, which can significantly reduce computational burden of calculating the new hypotheses, particularly for large numbers of tracks.

In particular, techniques are described for tracking objects based on a signal received by a sensor. In some embodiments, an outgoing signal is transmitted into an environment, and a return signal is received, where the return signal includes reflection of the outgoing signal from objects in the environment. A set of detected measurements is determined based on the received return signal, where the detected measurements corresponding to respective detections of objects in the environment. A group is determined, where the group includes a set of group measurements, from the set of detected measurements, and a set of group tracks associated with the set of group measurements. The set of group tracks includes: a first track, which is associated with a first previous factor, and a second track, which is associated with a second previous factor. The first previous factor includes a first set of previous track state hypotheses, and the first set of previous track state hypotheses is associated with a first set of existing tracks that includes the first track. The second previous factor includes a second set of previous track state hypotheses, and the second set of previous track state hypotheses is associated with a second set of existing tracks that includes the second track. A merged factor is created by calculating the cross-product of the first set of previous track state hypotheses and the second set of previous track state hypotheses. The merged factor includes a merged set of track state hypotheses associated with a merged set of existing tracks including the first set of existing tracks and the second set of existing tracks. In accordance with a determination that the merged factor satisfies a splitting condition, a first new factor and a second new factor are determined. The first new factor is associated with a first subset of the group measurements and a first subset of the merged set of existing tracks. The second new factor is associated with a second subset of the group measurements and a second subset of the merged set of existing tracks. The first subset of the group measurements and the second subset of the group measurements are mutually exclusive. The first subset of the merged set of existing tracks and the second subset of the set of existing tracks are mutually exclusive. A first set of new track state hypotheses is calculated for the first new factor based on the first subset of the group measurements, and a second set of new track state hypotheses is calculated for the second new factor based on the second subset of the group measurements.

These and other aspects, features, and implementations can be expressed as methods, apparatuses, systems, components, program products, means or steps for performing a function, and in other ways.

These and other aspects, features, and implementations will become apparent from the following descriptions, including the claims.

BRIEF DESCRIPTION OF THE DRAWINGS

FIG. 6 shows an example of a LiDAR system.

FIGS. 14A-14C show exemplary probability distributions, according to some embodiments.

DETAILED DESCRIPTION

Figure 1:
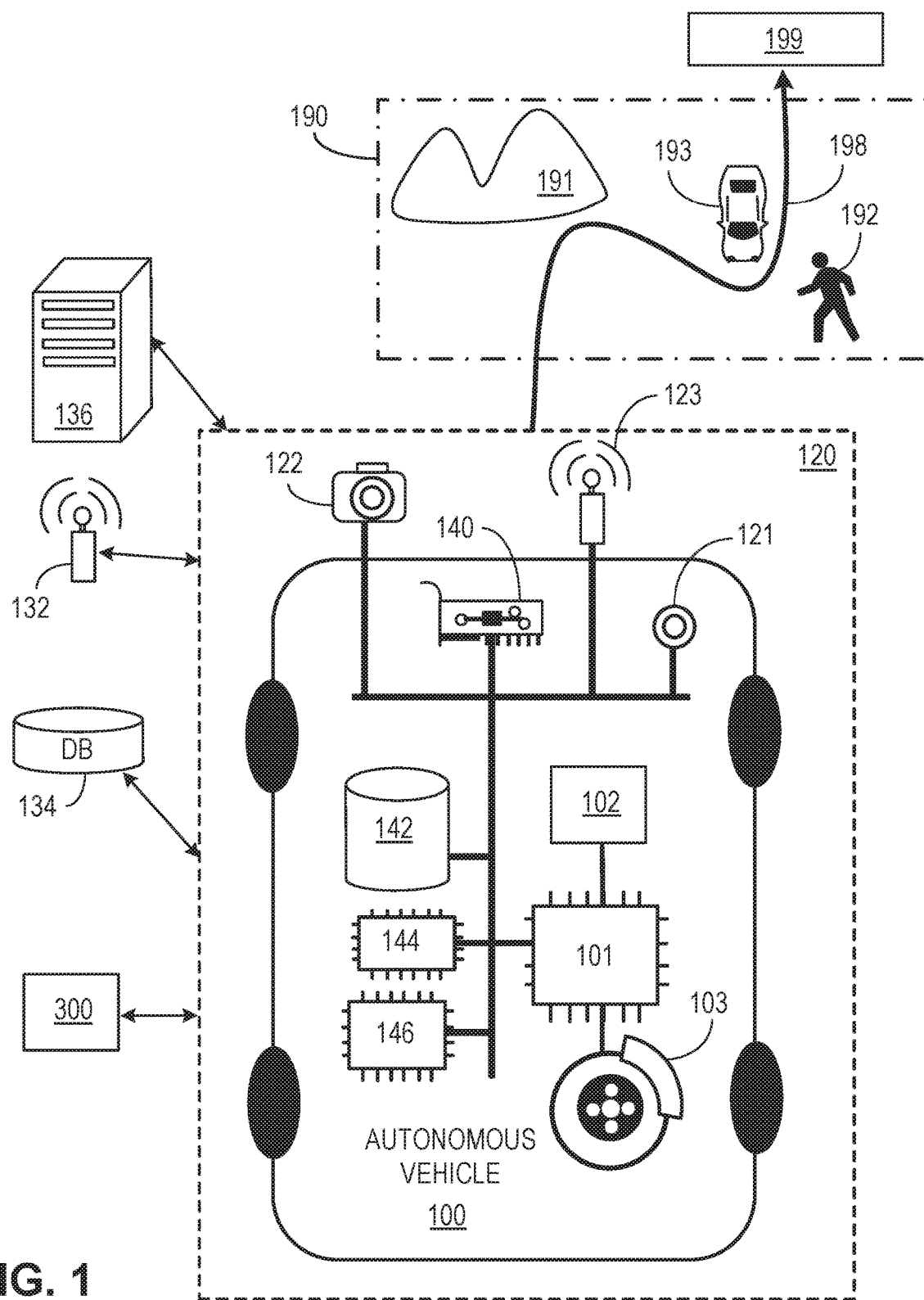
FIG. 1 shows an example of an autonomous vehicle having autonomous capability.

In the following description, for the purposes of explanation, numerous specific details are set forth in order to provide a thorough understanding of the present disclosure. It will be apparent, however, that the described techniques may be practiced without these specific details. In other instances, well-known structures and devices are shown in block diagram form in order to avoid unnecessarily obscuring the described features.

In the drawings, specific arrangements or orderings of schematic elements, such as those representing devices, modules, instruction blocks and data elements, are shown for ease of description. However, it should be understood by those skilled in the art that the specific ordering or arrangement of the schematic elements in the drawings is not meant to imply that a particular order or sequence of processing, or separation of processes, is required. Further, the inclusion of a schematic element in a drawing is not meant to imply that such element is required in all embodiments or that the features represented by such element may not be included in or combined with other elements in some embodiments.

Further, in the drawings, where connecting elements, such as solid or dashed lines or arrows, are used to illustrate a connection, relationship, or association between or among two or more other schematic elements, the absence of any such connecting elements is not meant to imply that no connection, relationship, or association can exist. In other words, some connections, relationships, or associations between elements are not shown in the drawings so as not to obscure the disclosure. In addition, for ease of illustration, a single connecting element is used to represent multiple connections, relationships or associations between elements. For example, where a connecting element represents a communication of signals, data, or instructions, it should be understood by those skilled in the art that such element represents one or multiple signal paths (e.g., a bus), as may be needed, to affect the communication.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

Several features are described hereafter that can each be used independently of one another or with any combination of other features. However, any individual feature may not address any of the problems discussed above or might only address one of the problems discussed above. Some of the problems discussed above might not be fully addressed by any of the features described herein. Although headings are provided, information related to a particular heading, but not found in the section having that heading, may also be found elsewhere in this description. Embodiments are described herein according to the following outline:

1. General Overview
2. Hardware Overview
3. Autonomous Vehicle Architecture
4. Autonomous Vehicle Inputs
5. Autonomous Vehicle Planning
6. Autonomous Vehicle Control
7. Computing System for Object Detection Using Pillars
8. Example Point Clouds and Pillars
9. Example Process for Detecting Objects and Operating the Vehicle Based on the Detection of the Objects General Overview Autonomous vehicles driving in complex environments (e.g., an urban environment) pose a great technological challenge. In order for autonomous vehicles to navigate these environments, the vehicles detect various types of objects such as vehicles, pedestrians, and bikes in real-time using sensors such as LiDAR or RADAR. As mentioned, one approach for filtering sensor data and tracking objects includes merging sets of existing track state hypotheses to create a merged factor (e.g., a set of merged hypotheses) and then, prior to updating the track state hypotheses (e.g., calculating new track state hypotheses), splitting the merged factor into two or more new factors. Splitting the merged factor allows some tracks to be treated as independent of other tracks for the purpose of updating the hypotheses, which can significantly reduce computational burden of calculating the new hypotheses, particularly for large numbers of tracks.

For example, an outgoing signal is transmitted into an environment, and a return signal is received, where the return signal includes reflection of the outgoing signal from objects in the environment. A set of detected measurements is determined based on the received return signal, where the detected measurements corresponding to respective detections of objects in the environment. A group is determined, where the group includes a set of group measurements, from the set of detected measurements, and a set of group tracks associated with the set of group measurements. The set of group tracks includes: a first track, which is associated with a first previous factor, and a second track, which is associated with a second previous factor. The first previous factor includes a first set of previous track state hypotheses, and the first set of previous track state hypotheses is associated with a first set of existing tracks that includes the first track. The second previous factor includes a second set of previous track state hypotheses, and the second set of previous track state hypotheses is associated with a second set of existing tracks that includes the second track. A merged factor is created by calculating the cross-product of the first set of previous track state hypotheses and the second set of previous track state hypotheses. The merged factor includes a merged set of track state hypotheses associated with a merged set of existing tracks including the first set of existing tracks and the second set of existing tracks. In accordance with a determination that the merged factor satisfies a splitting condition, a first new factor and a second new factor are determined. The first new factor is associated with a first subset of the group measurements and a first subset of the merged set of existing tracks. The second new factor is associated with a second subset of the group measurements and a second subset of the merged set of existing tracks. The first subset of the group measurements and the second subset of the group measurements are mutually exclusive. The first subset of the merged set of existing tracks and the second subset of the set of existing tracks are mutually exclusive. A first set of new track state hypotheses is calculated for the first new factor based on the first subset of the group measurements, and a second set of new track state hypotheses is calculated for the second new factor based on the second subset of the group measurements.

Hardware Overview

FIG. 1 shows an example of an autonomous vehicle 100 having autonomous capability.

As used herein, the term "autonomous capability" refers to a function, feature, or facility that enables a vehicle to be partially or fully operated without real-time human intervention, including without limitation fully autonomous vehicles, highly autonomous vehicles, and conditionally autonomous vehicles.

As used herein, an autonomous vehicle (AV) is a vehicle that possesses autonomous capability.

As used herein, "vehicle" includes means of transportation of goods or people. For example, cars, buses, trains, airplanes, drones, trucks, boats, ships, submersibles, dirigibles, etc. A driverless car is an example of a vehicle.

As used herein, "trajectory" refers to a path or route to navigate an AV from a first spatiotemporal location to second spatiotemporal location. In an embodiment, the first spatiotemporal location is referred to as the initial or starting location and the second spatiotemporal location is referred to as the destination, final location, goal, goal position, or goal location. In some examples, a trajectory is made up of one or more segments (e.g., sections of road) and each segment is made up of one or more blocks (e.g., portions of a lane or intersection). In an embodiment, the spatiotemporal locations correspond to real world locations. For example, the spatiotemporal locations are pick up or drop-off locations to pick up or drop-off persons or goods.

As used herein, "sensor(s)" includes one or more hardware components that detect information about the environment surrounding the sensor. Some of the hardware components can include sensing components (e.g., image sensors, biometric sensors), transmitting and/or receiving components (e.g., laser or radio frequency wave transmitters and receivers), electronic components such as analog-to-digital converters, a data storage device (such as a RAM and/or a nonvolatile storage), software or firmware components and data processing components such as an ASIC (application-specific integrated circuit), a microprocessor and/or a microcontroller.

As used herein, a "scene description" is a data structure (e.g., list) or data stream that includes one or more classified or labeled objects detected by one or more sensors on the AV vehicle or provided by a source external to the AV.

As used herein, a "road" is a physical area that can be traversed by a vehicle, and may correspond to a named thoroughfare (e.g., city street, interstate freeway, etc.) or may correspond to an unnamed thoroughfare (e.g., a driveway in a house or office building, a section of a parking lot, a section of a vacant lot, a dirt path in a rural area, etc.). Because some vehicles (e.g., 4-wheel-drive pickup trucks, sport utility vehicles, etc.) are capable of traversing a variety of physical areas not specifically adapted for vehicle travel, a "road" may be a physical area not formally defined as a thoroughfare by any municipality or other governmental or administrative body.

As used herein, a "lane" is a portion of a road that can be traversed by a vehicle, and may correspond to most or all of the space between lane markings, or may correspond to only some (e.g., less than 50%) of the space between lane markings. For example, a road having lane markings spaced far apart might accommodate two or more vehicles between the markings, such that one vehicle can pass the other without traversing the lane markings, and thus could be interpreted as having a lane narrower than the space between the lane markings, or having two lanes between the lane markings. A lane could also be interpreted in the absence of lane markings. For example, a lane may be defined based on physical features of an environment, e.g., rocks and trees along a thoroughfare in a rural area.

"One or more" includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this description, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

As used herein, an AV system refers to the AV along with the array of hardware, software, stored data, and data generated in real-time that supports the operation of the AV. In an embodiment, the AV system is incorporated within the AV. In an embodiment, the AV system is spread across several locations. For example, some of the software of the AV system is implemented on a cloud computing environment similar to cloud computing environment 300 described below with respect to FIG. 3.

In general, this document describes technologies applicable to any vehicles that have one or more autonomous capabilities including fully autonomous vehicles, highly autonomous vehicles, and conditionally autonomous vehicles, such as so-called Level 5, Level 4 and Level 3 vehicles, respectively (see SAE International's standard J3016: Taxonomy and Definitions for Terms Related to On-Road Motor Vehicle Automated Driving Systems, which is incorporated by reference in its entirety, for more details on the classification of levels of autonomy in vehicles). The technologies described in this document are also applicable to partially autonomous vehicles and driver assisted vehicles, such as so-called Level 2 and Level 1 vehicles (see SAE International's standard J3016: Taxonomy and Definitions for Terms Related to On-Road Motor Vehicle Automated Driving Systems). In an embodiment, one or more of the Level 1, 2, 3, 4 and 5 vehicle systems may automate certain vehicle operations (e.g., steering, braking, and using maps) under certain operating conditions based on processing of sensor inputs. The technologies described in this document can benefit vehicles in any levels, ranging from fully autonomous vehicles to human-operated vehicles.

Referring to FIG. 1, an AV system 120 operates the AV 100 along a trajectory 198 through an environment 190 to a destination 199 (sometimes referred to as a final location) while avoiding objects (e.g., natural obstructions 191, vehicles 193, pedestrians 192, cyclists, and other obstacles) and obeying rules of the road (e.g., rules of operation or driving preferences).

In an embodiment, the AV system 120 includes devices 101 that are instrumented to receive and act on operational commands from the computer processors 146. In an embodiment, computing processors 146 are similar to the processor 304 described below in reference to FIG. 3. Examples of devices 101 include a steering control 102, brakes 103, gears, accelerator pedal or other acceleration control mechanisms, windshield wipers, side-door locks, window controls, and turn-indicators.

In an embodiment, the AV system 120 includes sensors 121 for measuring or inferring properties of state or condition of the AV 100, such as the AV's position, linear and angular velocity and acceleration, and heading (e.g., an orientation of the leading end of AV 100). Example of sensors 121 are GPS, inertial measurement units (IMU) that measure both vehicle linear accelerations and angular rates, wheel speed sensors for measuring or estimating wheel slip ratios, wheel brake pressure or braking torque sensors, engine torque or wheel torque sensors, and steering angle and angular rate sensors.

In an embodiment, the sensors 121 also include sensors for sensing or measuring properties of the AV's environment. For example, monocular or stereo video cameras 122 in the visible light, infrared or thermal (or both) spectra, LiDAR 123, RADAR, ultrasonic sensors, time-of-flight (TOF) depth sensors, speed sensors, temperature sensors, humidity sensors, and precipitation sensors.

In an embodiment, the AV system 120 includes a data storage unit 142 and memory 144 for storing machine instructions associated with computer processors 146 or data collected by sensors 121. In an embodiment, the data storage unit 142 is similar to the ROM 308 or storage device 310 described below in relation to FIG. 3. In an embodiment, memory 144 is similar to the main memory 306 described below. In an embodiment, the data storage unit 142 and memory 144 store historical, real-time, and/or predictive information about the environment 190. In an embodiment, the stored information includes maps, driving performance, traffic congestion updates or weather conditions. In an embodiment, data relating to the environment 190 is transmitted to the AV 100 via a communications channel from a remotely located database 134.

In an embodiment, the AV system 120 includes communications devices 140 for communicating measured or inferred properties of other vehicles' states and conditions, such as positions, linear and angular velocities, linear and angular accelerations, and linear and angular headings to the AV 100. These devices include Vehicle-to-Vehicle (V2V) and Vehicle-to-Infrastructure (V2I) communication devices and devices for wireless communications over point-to-point or ad hoc networks or both. In an embodiment, the communications devices 140 communicate across the electromagnetic spectrum (including radio and optical communications) or other media (e.g., air and acoustic media). A combination of Vehicle-to-Vehicle (V2V) Vehicle-to-Infrastructure (V2I) communication (and, in some embodiments, one or more other types of communication) is sometimes referred to as Vehicle-to-Everything (V2X) communication. V2X communication typically conforms to one or more communications standards for communication with, between, and among autonomous vehicles.

In an embodiment, the communication devices 140 include communication interfaces. For example, wired, wireless, WiMAX, WiFi, Bluetooth, satellite, cellular, optical, near field, infrared, or radio interfaces. The communication interfaces transmit data from a remotely located database 134 to AV system 120. In an embodiment, the remotely located database 134 is embedded in a cloud computing environment 200 as described in FIG. 2. The communication interfaces 140 transmit data collected from sensors 121 or other data related to the operation of AV 100 to the remotely located database 134. In an embodiment, communication interfaces 140 transmit information that relates to teleoperations to the AV 100. In some embodiments, the AV 100 communicates with other remote (e.g., "cloud") servers 136.

In an embodiment, the remotely located database 134 also stores and transmits digital data (e.g., storing data such as road and street locations). Such data is stored on the memory 144 on the AV 100, or transmitted to the AV 100 via a communications channel from the remotely located database 134.

In an embodiment, the remotely located database 134 stores and transmits historical information about driving properties (e.g., speed and acceleration profiles) of vehicles that have previously traveled along trajectory 198 at similar times of day. In one implementation, such data may be stored on the memory 144 on the AV 100, or transmitted to the AV 100 via a communications channel from the remotely located database 134.

Computing devices 146 located on the AV 100 algorithmically generate control actions based on both real-time sensor data and prior information, allowing the AV system 120 to execute its autonomous driving capabilities.

In an embodiment, the AV system 120 includes computer peripherals 132 coupled to computing devices 146 for providing information and alerts to, and receiving input from, a user (e.g., an occupant or a remote user) of the AV 100. In an embodiment, peripherals 132 are similar to the display 312, input device 314, and cursor controller 316 discussed below in reference to FIG. 3. The coupling is wireless or wired. Any two or more of the interface devices may be integrated into a single device.

Figure 2:
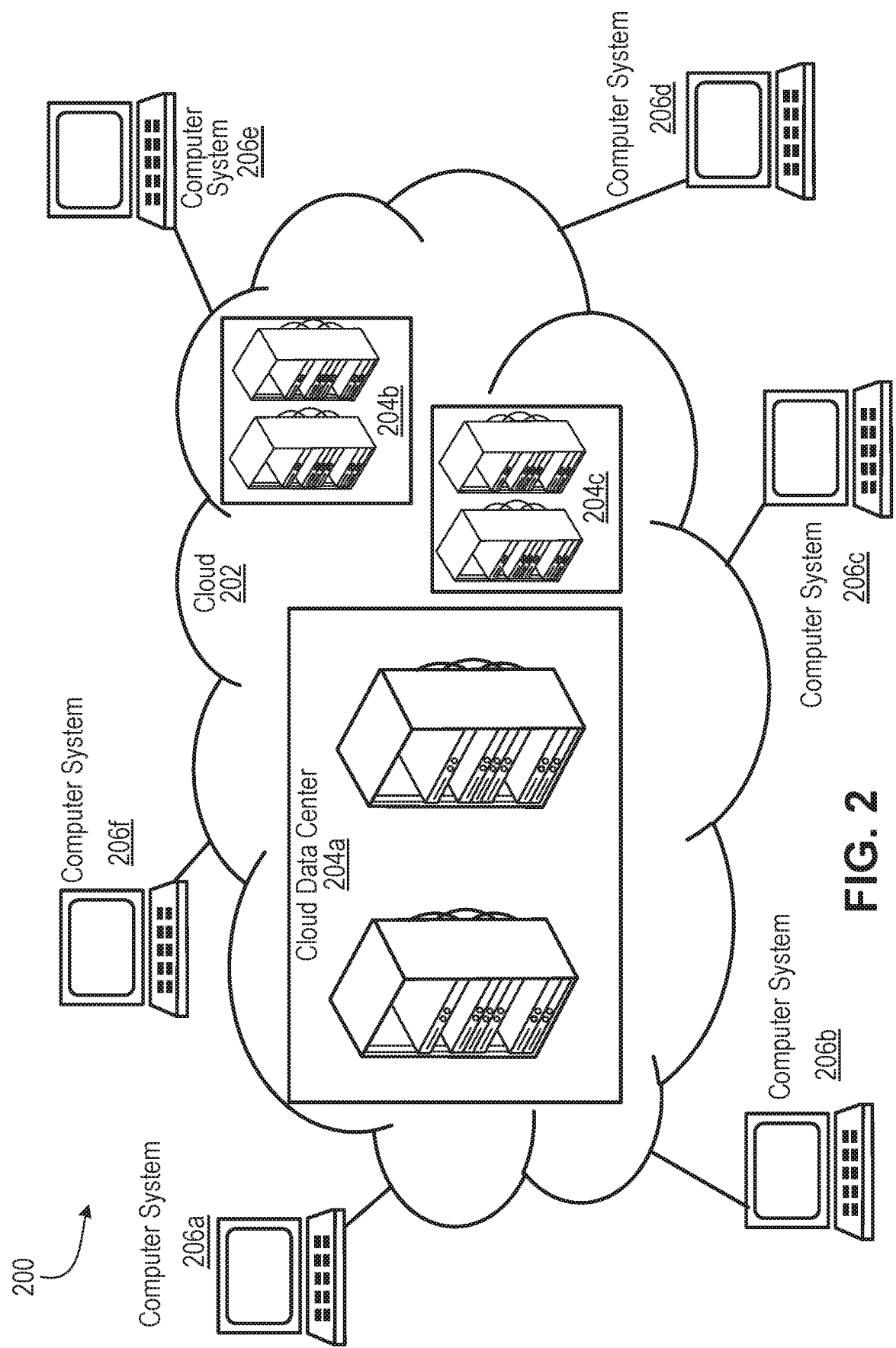
FIG. 2 illustrates an example "cloud" computing environment.

FIG. 2 illustrates an example "cloud" computing environment. Cloud computing is a model of service delivery for enabling convenient, on-demand network access to a shared pool of configurable computing resources (e.g. networks, network bandwidth, servers, processing, memory, storage, applications, virtual machines, and services). In typical cloud computing systems, one or more large cloud data centers house the machines used to deliver the services provided by the cloud. Referring now to FIG. 2, the cloud computing environment 200 includes cloud data centers 204a, 204b, and 204c that are interconnected through the cloud 202. Data centers 204a, 204b, and 204c provide cloud computing services to computer systems 206a, 206b, 206c, 206d, 206e, and 206f connected to cloud 202.

The cloud computing environment 200 includes one or more cloud data centers. In general, a cloud data center, for example the cloud data center 204a shown in FIG. 2, refers to the physical arrangement of servers that make up a cloud, for example the cloud 202 shown in FIG. 2, or a particular portion of a cloud. For example, servers are physically arranged in the cloud datacenter into rooms, groups, rows, and racks. A cloud datacenter has one or more zones, which include one or more rooms of servers. Each room has one or more rows of servers, and each row includes one or more racks. Each rack includes one or more individual server nodes. In some implementation, servers in zones, rooms, racks, and/or rows are arranged into groups based on physical infrastructure requirements of the datacenter facility, which include power, energy, thermal, heat, and/or other requirements. In an embodiment, the server nodes are similar to the computer system described in FIG. 3. The data center 204a has many computing systems distributed through many racks.

The cloud 202 includes cloud data centers 204a, 204b, and 204c along with the network and networking resources (for example, networking equipment, nodes, routers, switches, and networking cables) that interconnect the cloud data centers 204a, 204b, and 204c and help facilitate the computing systems' 206a-f access to cloud computing services. In an embodiment, the network represents any combination of one or more local networks, wide area networks, or internetworks coupled using wired or wireless links deployed using terrestrial or satellite connections. Data exchanged over the network, is transferred using any number of network layer protocols, such as Internet Protocol (IP), Multiprotocol Label Switching (MPLS), Asynchronous Transfer Mode (ATM), Frame Relay, etc. Furthermore, in embodiments where the network represents a combination of multiple sub-networks, different network layer protocols are used at each of the underlying sub-networks. In some embodiments, the network represents one or more interconnected internetworks, such as the public Internet.

The computing systems 206a-f or cloud computing services consumers are connected to the cloud 202 through network links and network adapters. In an embodiment, the computing systems 206a-f are implemented as various computing devices, for example servers, desktops, laptops, tablet, smartphones, Internet of Things (IOT) devices, autonomous vehicles (including, cars, drones, shuttles, trains, buses, etc.) and consumer electronics. In an embodiment, the computing systems 206a-f are implemented in or as a part of other systems.

Figure 3:
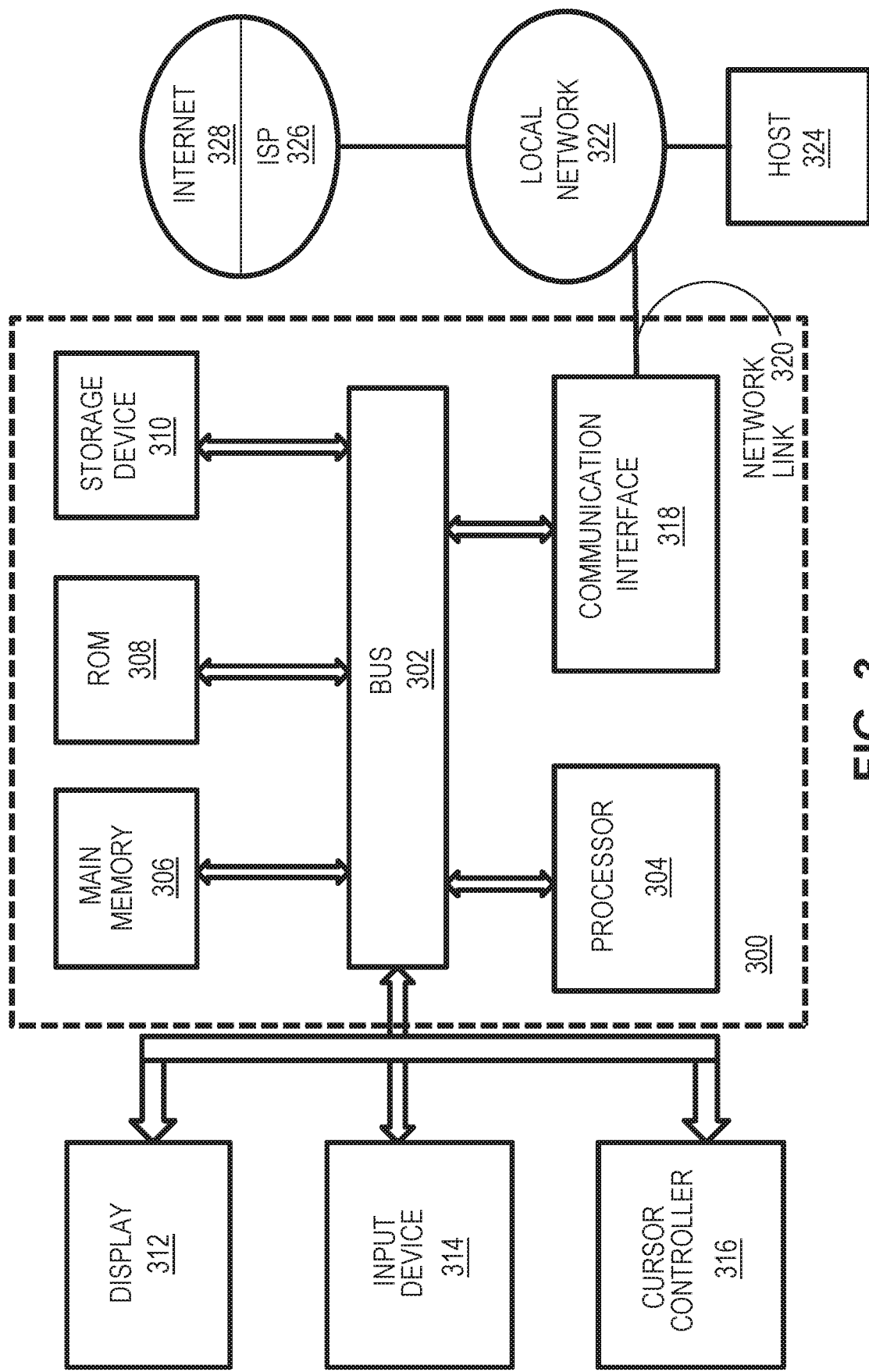
FIG. 3 illustrates a computer system.

FIG. 3 illustrates a computer system 300. In an implementation, the computer system 300 is a special purpose computing device. The special-purpose computing device is hard-wired to perform the techniques or includes digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. In various embodiments, the special-purpose computing devices are desktop computer systems, portable computer systems, handheld devices, network devices or any other device that incorporates hard-wired and/or program logic to implement the techniques.

In an embodiment, the computer system 300 includes a bus 302 or other communication mechanism for communicating information, and a hardware processor 304 coupled with a bus 302 for processing information. The hardware processor 304 is, for example, a general-purpose microprocessor. The computer system 300 also includes a main memory 306, such as a random-access memory (RAM) or other dynamic storage device, coupled to the bus 302 for storing information and instructions to be executed by processor 304. In one implementation, the main memory 306 is used for storing temporary variables or other intermediate information during execution of instructions to be executed by the processor 304. Such instructions, when stored in non-transitory storage media accessible to the processor 304, render the computer system 300 into a special-purpose machine that is customized to perform the operations specified in the instructions.

In an embodiment, the computer system 300 further includes a read only memory (ROM) 308 or other static storage device coupled to the bus 302 for storing static information and instructions for the processor 304. A storage device 310, such as a magnetic disk, optical disk, solid-state drive, or three-dimensional cross point memory is provided and coupled to the bus 302 for storing information and instructions.

In an embodiment, the computer system 300 is coupled via the bus 302 to a display 312, such as a cathode ray tube (CRT), a liquid crystal display (LCD), plasma display, light emitting diode (LED) display, or an organic light emitting diode (OLED) display for displaying information to a computer user. An input device 314, including alphanumeric and other keys, is coupled to bus 302 for communicating information and command selections to the processor 304. Another type of user input device is a cursor controller 316, such as a mouse, a trackball, a touch-enabled display, or cursor direction keys for communicating direction information and command selections to the processor 304 and for controlling cursor movement on the display 312. This input device typically has two degrees of freedom in two axes, a first axis (e.g., x-axis) and a second axis (e.g., y-axis), that allows the device to specify positions in a plane.

According to one embodiment, the techniques herein are performed by the computer system 300 in response to the processor 304 executing one or more sequences of one or more instructions contained in the main memory 306. Such instructions are read into the main memory 306 from another storage medium, such as the storage device 310. Execution of the sequences of instructions contained in the main memory 306 causes the processor 304 to perform the process steps described herein. In alternative embodiments, hard-wired circuitry is used in place of or in combination with software instructions.

The term "storage media" as used herein refers to any non-transitory media that store data and/or instructions that cause a machine to operate in a specific fashion. Such storage media includes non-volatile media and/or volatile media. Non-volatile media includes, for example, optical disks, magnetic disks, solid-state drives, or three-dimensional cross point memory, such as the storage device 310. Volatile media includes dynamic memory, such as the main memory 306. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NV-RAM, or any other memory chip or cartridge.

Storage media is distinct from but may be used in conjunction with transmission media. Transmission media participates in transferring information between storage media. For example, transmission media includes coaxial cables, copper wire and fiber optics, including the wires that comprise the bus 302. Transmission media can also take the form of acoustic or light waves, such as those generated during radio-wave and infrared data communications.

In an embodiment, various forms of media are involved in carrying one or more sequences of one or more instructions to the processor 304 for execution. For example, the instructions are initially carried on a magnetic disk or solid-state drive of a remote computer. The remote computer loads the instructions into its dynamic memory and send the instructions over a telephone line using a modem. A modem local to the computer system 300 receives the data on the telephone line and use an infrared transmitter to convert the data to an infrared signal. An infrared detector receives the data carried in the infrared signal and appropriate circuitry places the data on the bus 302. The bus 302 carries the data to the main memory 306, from which processor 304 retrieves and executes the instructions. The instructions received by the main memory 306 may optionally be stored on the storage device 310 either before or after execution by processor 304.

The computer system 300 also includes a communication interface 318 coupled to the bus 302. The communication interface 318 provides a two-way data communication coupling to a network link 320 that is connected to a local network 322. For example, the communication interface 318 is an integrated service digital network (ISDN) card, cable modem, satellite modem, or a modem to provide a data communication connection to a corresponding type of telephone line. As another example, the communication interface 318 is a local area network (LAN) card to provide a data communication connection to a compatible LAN. In some implementations, wireless links are also implemented. In any such implementation, the communication interface 318 sends and receives electrical, electromagnetic, or optical signals that carry digital data streams representing various types of information.

The network link 320 typically provides data communication through one or more networks to other data devices. For example, the network link 320 provides a connection through the local network 322 to a host computer 324 or to a cloud data center or equipment operated by an Internet Service Provider (ISP) 326. The ISP 326 in turn provides data communication services through the world-wide packet data communication network now commonly referred to as the "Internet" 328. The local network 322 and Internet 328 both use electrical, electromagnetic or optical signals that carry digital data streams. The signals through the various networks and the signals on the network link 320 and through the communication interface 318, which carry the digital data to and from the computer system 300, are example forms of transmission media. In an embodiment, the network 320 contains the cloud 202 or a part of the cloud 202 described above.

The computer system 300 sends messages and receives data, including program code, through the network(s), the network link 320, and the communication interface 318. In an embodiment, the computer system 300 receives code for processing. The received code is executed by the processor 304 as it is received, and/or stored in storage device 310, or other non-volatile storage for later execution.

Autonomous Vehicle Architecture

Figure 4:
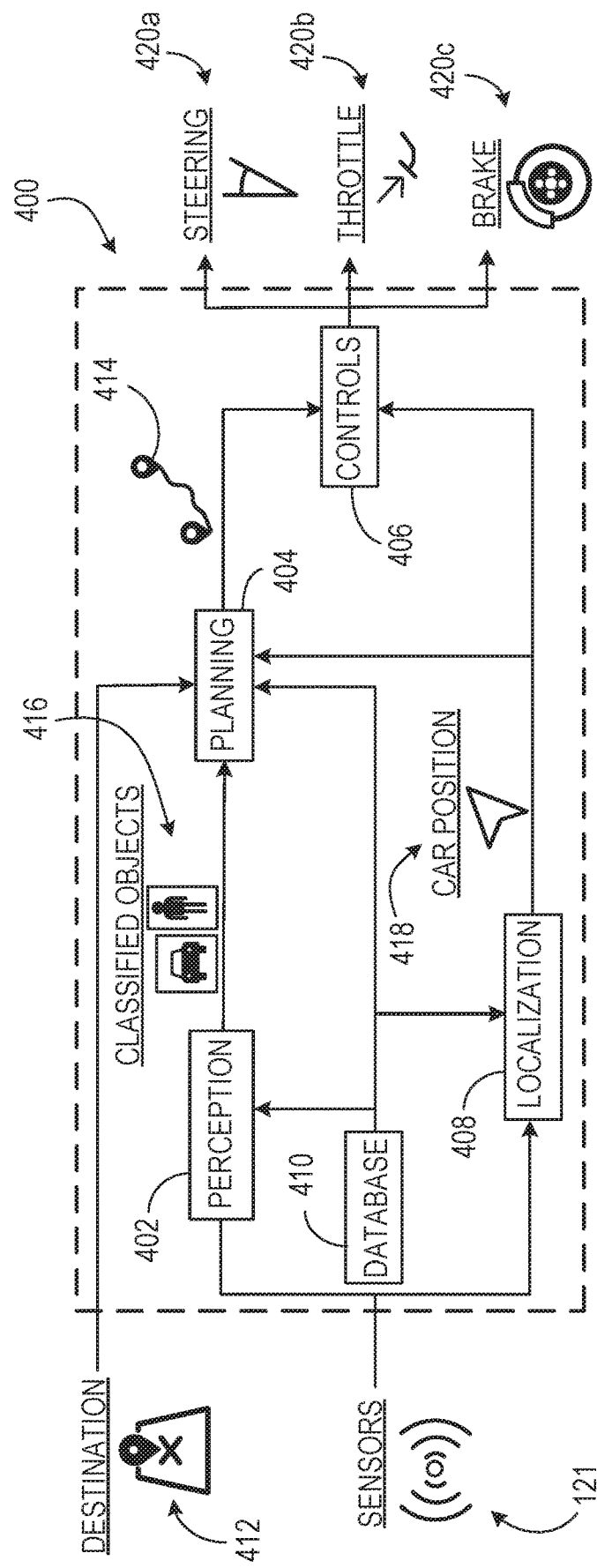
FIG. 4 shows an example architecture for an autonomous vehicle.

FIG. 4 shows an example architecture 400 for an autonomous vehicle (e.g., the AV 100 shown in FIG. 1). The architecture 400 includes a perception module 402 (sometimes referred to as a perception circuit), a planning module 404 (sometimes referred to as a planning circuit), a control module 406 (sometimes referred to as a control circuit), a localization module 408 (sometimes referred to as a localization circuit), and a database module 410 (sometimes referred to as a database circuit). Each module plays a role in the operation of the AV 100. Together, the modules 402, 404, 406, 408, and 410 may be part of the AV system 120 shown in FIG. 1. In some embodiments, any of the modules 402, 404, 406, 408, and 410 is a combination of computer software (e.g., executable code stored on a computer-readable medium) and computer hardware (e.g., one or more microprocessors, microcontrollers, application-specific integrated circuits [ASICs]), hardware memory devices, other types of integrated circuits, other types of computer hardware, or a combination of any or all of these things).

In use, the planning module 404 receives data representing a destination 412 and determines data representing a trajectory 414 (sometimes referred to as a route) that can be traveled by the AV 100 to reach (e.g., arrive at) the destination 412. In order for the planning module 404 to determine the data representing the trajectory 414, the planning module 404 receives data from the perception module 402, the localization module 408, and the database module 410.

The perception module 402 identifies nearby physical objects using one or more sensors 121, e.g., as also shown in FIG. 1. The objects are classified (e.g., grouped into types such as pedestrian, bicycle, automobile, traffic sign, etc.) and a scene description including the classified objects 416 is provided to the planning module 404.

The planning module 404 also receives data representing the AV position 418 from the localization module 408. The localization module 408 determines the AV position by using data from the sensors 121 and data from the database module 410 (e.g., a geographic data) to calculate a position. For example, the localization module 408 uses data from a GNSS (Global Navigation Satellite System) sensor and geographic data to calculate a longitude and latitude of the AV. In an embodiment, data used by the localization module 408 includes high-precision maps of the roadway geometric properties, maps describing road network connectivity properties, maps describing roadway physical properties (such as traffic speed, traffic volume, the number of vehicular and cyclist traffic lanes, lane width, lane traffic directions, or lane marker types and locations, or combinations of them), and maps describing the spatial locations of road features such as crosswalks, traffic signs or other travel signals of various types.

The control module 406 receives the data representing the trajectory 414 and the data representing the AV position 418 and operates the control functions 420a-c (e.g., steering, throttling, braking, ignition) of the AV in a manner that will cause the AV 100 to travel the trajectory 414 to the destination 412. For example, if the trajectory 414 includes a left turn, the control module 406 will operate the control functions 420a-c in a manner such that the steering angle of the steering function will cause the AV 100 to turn left and the throttling and braking will cause the AV 100 to pause and wait for passing pedestrians or vehicles before the turn is made.

Autonomous Vehicle Inputs

Figure 5:
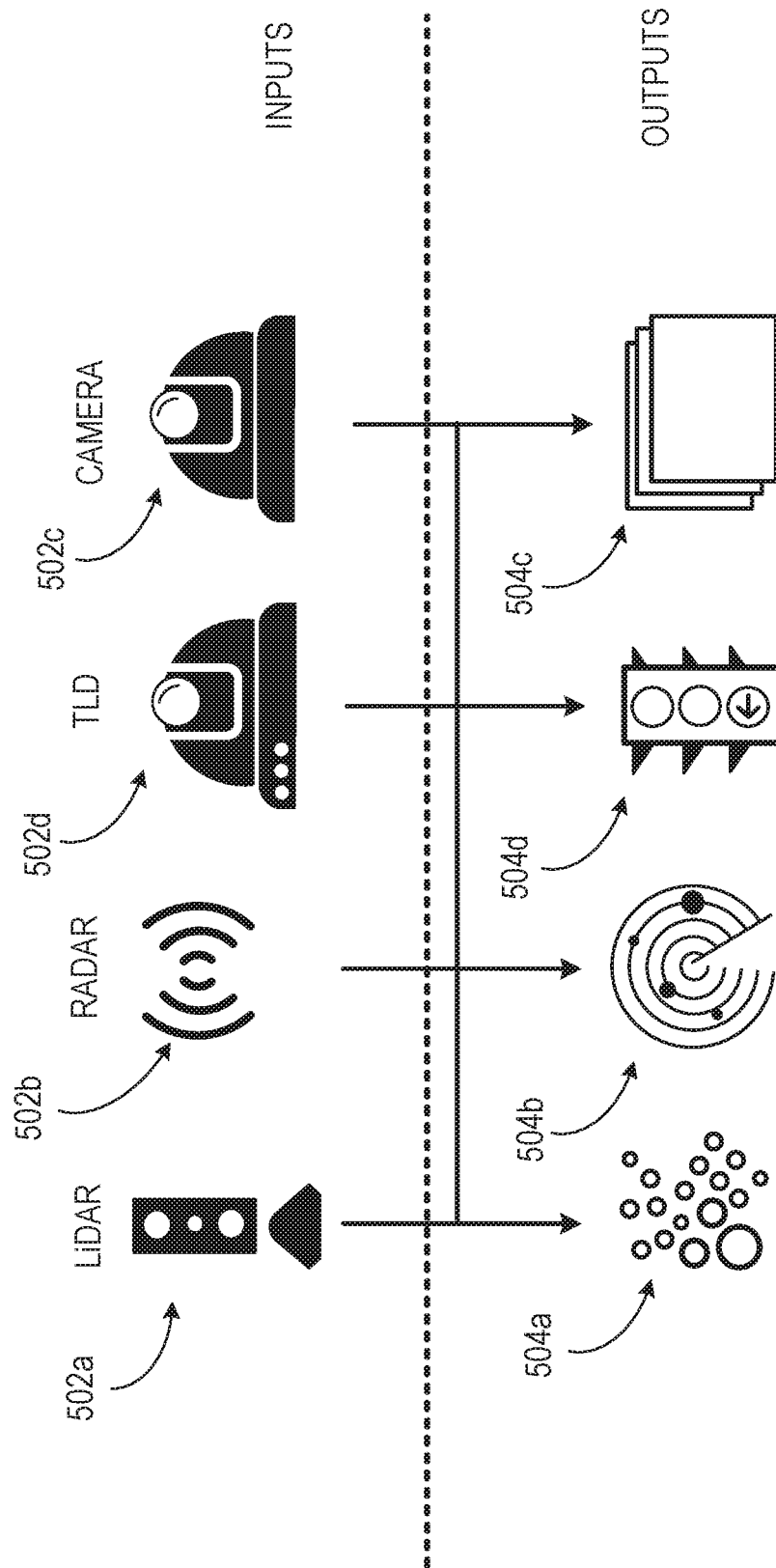
FIG. 5 shows an example of inputs and outputs that may be used by a perception module.

FIG. 5 shows an example of inputs 502a-d (e.g., sensors 121 shown in FIG. 1) and outputs 504a-d (e.g., sensor data) that is used by the perception module 402 (FIG. 4). One input 502a is a LiDAR (Light Detection and Ranging) system (e.g., LiDAR 123 shown in FIG. 1). LiDAR is a technology that uses light (e.g., bursts of light such as infrared light) to obtain data about physical objects in its line of sight. A LiDAR system produces LiDAR data as output 504a. For example, LiDAR data is collections of 3D or 2D points (also known as a point clouds) that are used to construct a representation of the environment 190.

Another input 502b is a RADAR system. RADAR is a technology that uses radio waves to obtain data about nearby physical objects. RADARs can obtain data about objects not within the line of sight of a LiDAR system. A RADAR system 502b produces RADAR data as output 504b. For example, RADAR data are one or more radio frequency electromagnetic signals that are used to construct a representation of the environment 190.

Another input 502c is a camera system. A camera system uses one or more cameras (e.g., digital cameras using a light sensor such as a charge-coupled device [CCD]) to obtain information about nearby physical objects. A camera system produces camera data as output 504c. Camera data often takes the form of image data (e.g., data in an image data format such as RAW, JPEG, PNG, etc.). In some examples, the camera system has multiple independent cameras, e.g., for the purpose of stereopsis (stereo vision), which enables the camera system to perceive depth. Although the objects perceived by the camera system are described here as "nearby," this is relative to the AV. In use, the camera system may be configured to "see" objects far, e.g., up to a kilometer or more ahead of the AV. Accordingly, the camera system may have features such as sensors and lenses that are optimized for perceiving objects that are far away.

Another input 502d is a traffic light detection (TLD) system. A TLD system uses one or more cameras to obtain information about traffic lights, street signs, and other physical objects that provide visual navigation information. A TLD system produces TLD data as output 504d. TLD data often takes the form of image data (e.g., data in an image data format such as RAW, JPEG, PNG, etc.). A TLD system differs from a system incorporating a camera in that a TLD system uses a camera with a wide field of view (e.g., using a wide-angle lens or a fish-eye lens) in order to obtain information about as many physical objects providing visual navigation information as possible, so that the AV 100 has access to all relevant navigation information provided by these objects. For example, the viewing angle of the TLD system may be about 120 degrees or more.

In some embodiments, outputs 504a-d are combined using a sensor fusion technique. Thus, either the individual outputs 504a-d are provided to other systems of the AV 100 (e.g., provided to a planning module 404 as shown in FIG. 4), or the combined output can be provided to the other systems, either in the form of a single combined output or multiple combined outputs of the same type (e.g., using the same combination technique or combining the same outputs or both) or different types type (e.g., using different respective combination techniques or combining different respective outputs or both). In some embodiments, an early fusion technique is used. An early fusion technique is characterized by combining outputs before one or more data processing steps are applied to the combined output. In some embodiments, a late fusion technique is used. A late fusion technique is characterized by combining outputs after one or more data processing steps are applied to the individual outputs.

FIG. 6 shows an example of a LiDAR system 602 (e.g., the input 502a shown in FIG. 5). The LiDAR system 602 emits light 604a-c from a light emitter 606 (e.g., a laser transmitter). Light emitted by a LiDAR system is typically not in the visible spectrum; for example, infrared light is often used. Some of the light 604b emitted encounters a physical object 608 (e.g., a vehicle) and reflects back to the LiDAR system 602. (Light emitted from a LiDAR system typically does not penetrate physical objects, e.g., physical objects in solid form.) The LiDAR system 602 also has one or more light detectors 610, which detect the reflected light. In an embodiment, one or more data processing systems associated with the LiDAR system generates an image 612 representing the field of view 614 of the LiDAR system. The image 612 includes information that represents the boundaries 616 of a physical object 608. In this way, the image 612 is used to determine the boundaries 616 of one or more physical objects near an AV.

Figure 7:
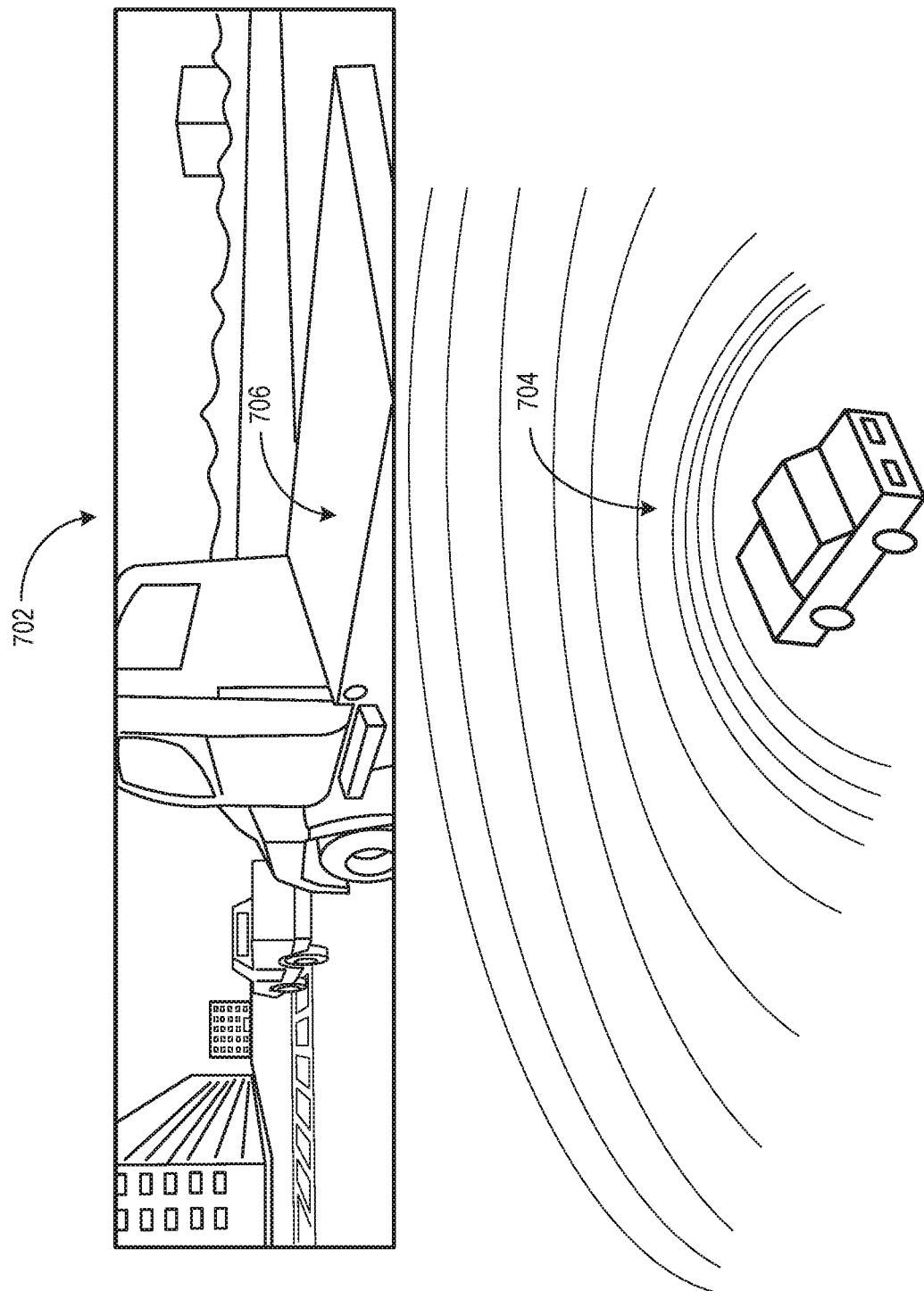
FIG. 7 shows the LiDAR system in operation.

FIG. 7 shows the LiDAR system 602 in operation. In the scenario shown in this figure, the AV 100 receives both camera system output 504c in the form of an image 702 and LiDAR system output 504a in the form of LiDAR data points 704. In use, the data processing systems of the AV 100 compares the image 702 to the data points 704. In particular, a physical object 706 identified in the image 702 is also identified among the data points 704. In this way, the AV 100 perceives the boundaries of the physical object based on the contour and density of the data points 704.

Figure 8:
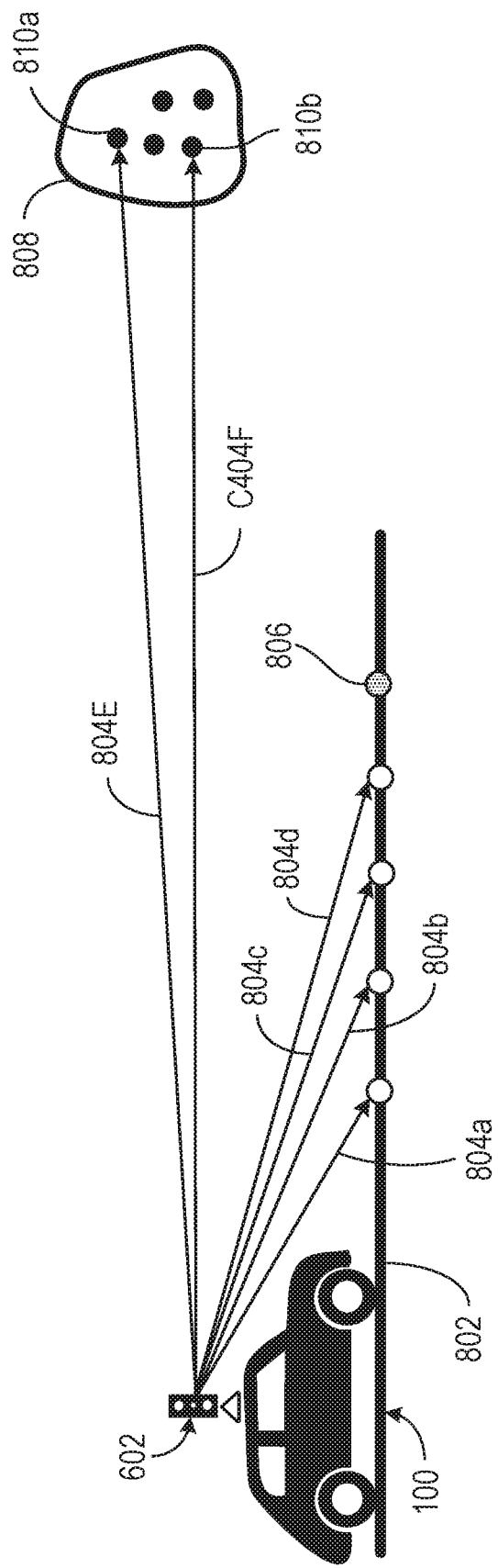
FIG. 8 shows the operation of the LiDAR system in additional detail.

FIG. 8 shows the operation of the LiDAR system 602 in additional detail. As described above, the AV 100 detects the boundary of a physical object based on characteristics of the data points detected by the LiDAR system 602. As shown in FIG. 8, a flat object, such as the ground 802, will reflect light 804a-d emitted from a LiDAR system 602 in a consistent manner. Put another way, because the LiDAR system 602 emits light using consistent spacing, the ground 802 will reflect light back to the LiDAR system 602 with the same consistent spacing. As the AV 100 travels over the ground 802, the LiDAR system 602 will continue to detect light reflected by the next valid ground point 806 if nothing is obstructing the road. However, if an object 808 obstructs the road, light 804e-f emitted by the LiDAR system 602 will be reflected from points 810a-b in a manner inconsistent with the expected consistent manner. From this information, the AV 100 can determine that the object 808 is present.

Path Planning

Figure 9:
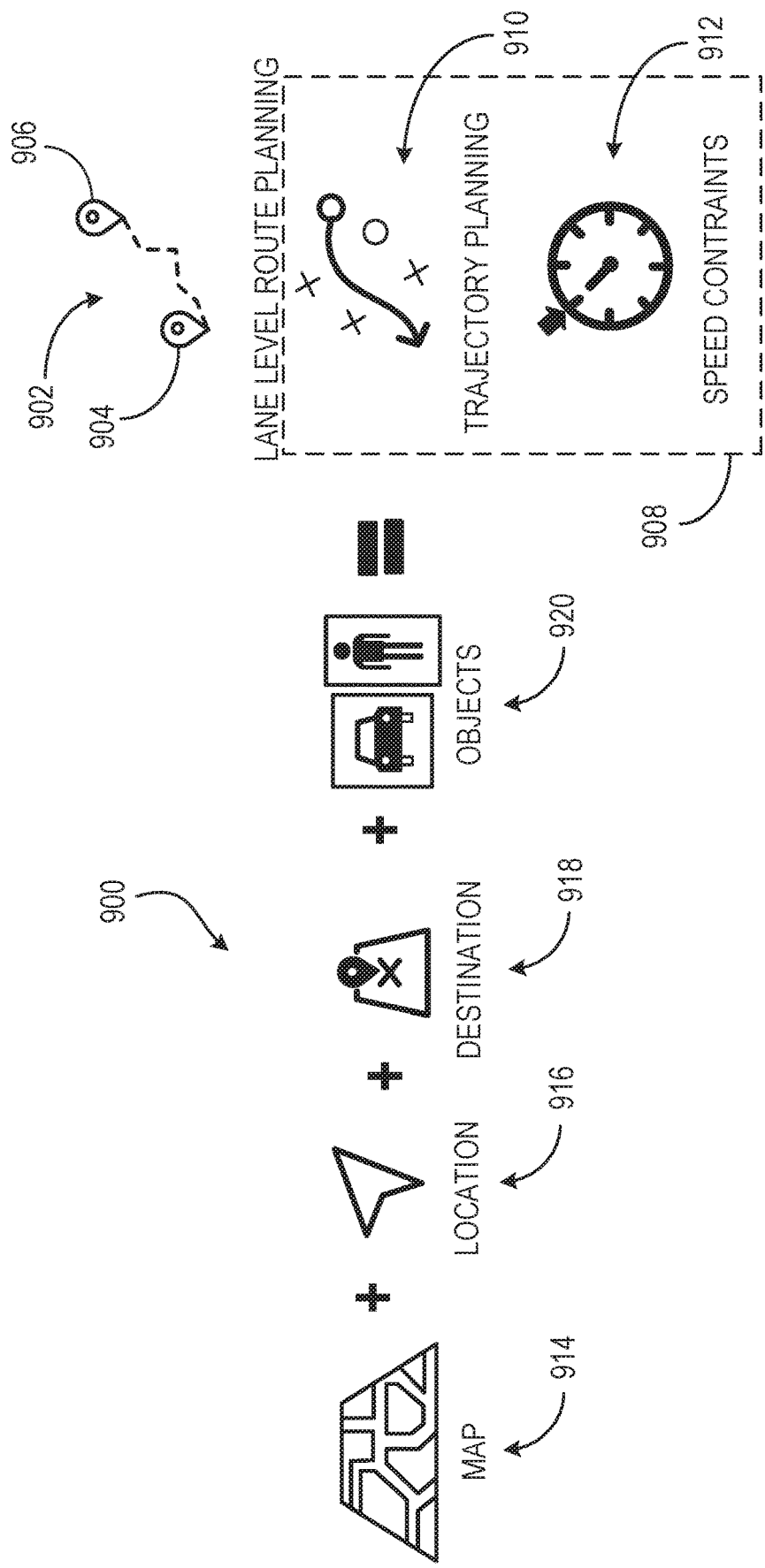
FIG. 9 shows a block diagram of the relationships between inputs and outputs of a planning module.

FIG. 9 shows a block diagram 900 of the relationships between inputs and outputs of a planning module 404 (e.g., as shown in FIG. 4). In general, the output of a planning module 404 is a route 902 from a start point 904 (e.g., source location or initial location), and an end point 906 (e.g., destination or final location). The route 902 is typically defined by one or more segments. For example, a segment is a distance to be traveled over at least a portion of a street, road, highway, driveway, or other physical area appropriate for automobile travel. In some examples, e.g., if the AV 100 is an off-road capable vehicle such as a four-wheel-drive (4WD) or all-wheel-drive (AWD) car, SUV, pick-up truck, or the like, the route 902 includes "off-road" segments such as unpaved paths or open fields.

In addition to the route 902, a planning module also outputs lane-level route planning data 908. The lane-level route planning data 908 is used to traverse segments of the route 902 based on conditions of the segment at a particular time. For example, if the route 902 includes a multi-lane highway, the lane-level route planning data 908 includes trajectory planning data 910 that the AV 100 can use to choose a lane among the multiple lanes, e.g., based on whether an exit is approaching, whether one or more of the lanes have other vehicles, or other factors that vary over the course of a few minutes or less. Similarly, in some implementations, the lane-level route planning data 908 includes speed constraints 912 specific to a segment of the route 902. For example, if the segment includes pedestrians or unexpected traffic, the speed constraints 912 may limit the AV 100 to a travel speed slower than an expected speed, e.g., a speed based on speed limit data for the segment.

In an embodiment, the inputs to the planning module 404 includes database data 914 (e.g., from the database module 410 shown in FIG. 4), current location data 916 (e.g., the AV position 418 shown in FIG. 4), destination data 918 (e.g., for the destination 412 shown in FIG. 4), and object data 920 (e.g., the classified objects 416 as perceived by the perception module 402 as shown in FIG. 4). In some embodiments, the database data 914 includes rules used in planning. Rules are specified using a formal language, e.g., using Boolean logic. In any given situation encountered by the AV 100, at least some of the rules will apply to the situation. A rule applies to a given situation if the rule has conditions that are met based on information available to the AV 100, e.g., information about the surrounding environment. Rules can have priority. For example, a rule that says, "if the road is a freeway, move to the leftmost lane" can have a lower priority than "if the exit is approaching within a mile, move to the rightmost lane."

Figure 10:
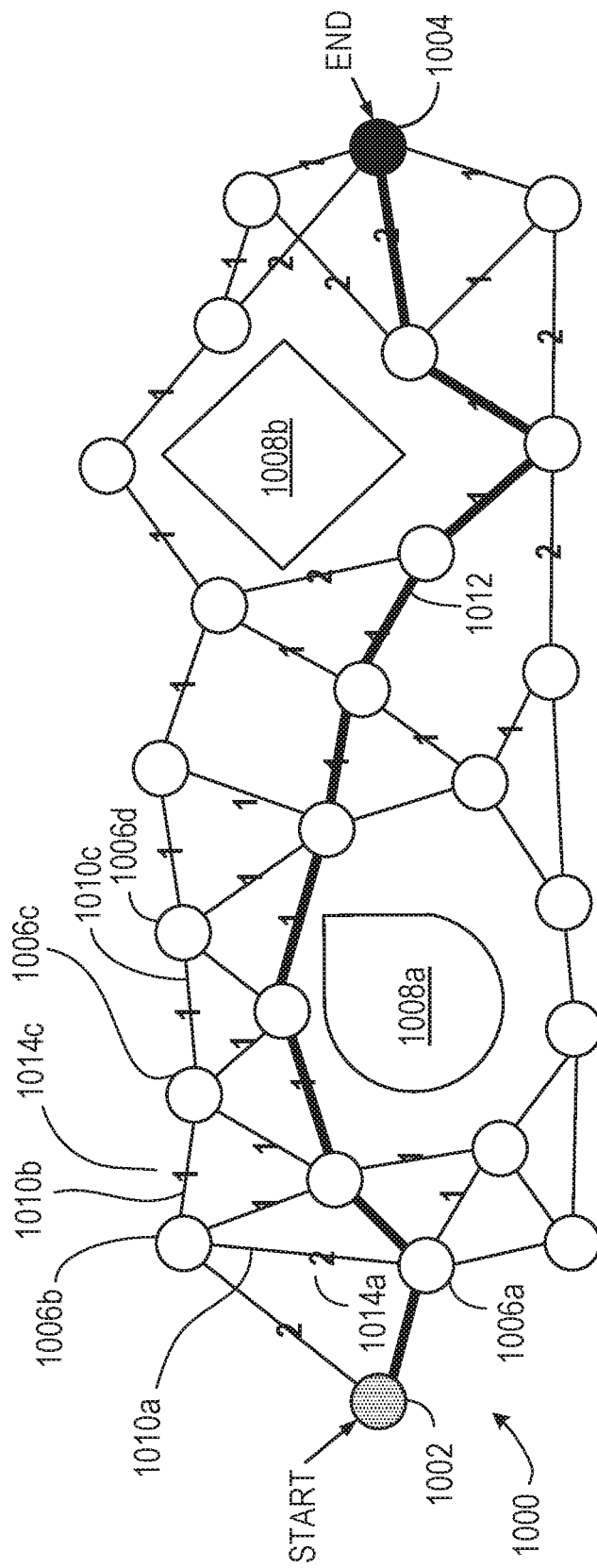
FIG. 10 shows a directed graph used in path planning.

FIG. 10 shows a directed graph 1000 used in path planning, e.g., by the planning module 404 (FIG. 4). In general, a directed graph 1000 like the one shown in FIG. 10 is used to determine a path between any start point 1002 and end point 1004. In real-world terms, the distance separating the start point 1002 and end point 1004 may be relatively large (e.g, in two different metropolitan areas) or may be relatively small (e.g., two intersections abutting a city block or two lanes of a multi-lane road).

In an embodiment, the directed graph 1000 has nodes 1006*a-d* representing different locations between the start point 1002 and the end point 1004 that could be occupied by an AV 100. In some examples, e.g., when the start point 1002 and end point 1004 represent different metropolitan areas, the nodes 1006*a-d* represent segments of roads. In some examples, e.g., when the start point 1002 and the end point 1004 represent different locations on the same road, the nodes 1006*a-d* represent different positions on that road. In this way, the directed graph 1000 includes information at varying levels of granularity. In an embodiment, a directed graph having high granularity is also a subgraph of another directed graph having a larger scale. For example, a directed graph in which the start point 1002 and the end point 1004 are far away (e.g., many miles apart) has most of its information at a low granularity and is based on stored data, but also includes some high granularity information for the portion of the graph that represents physical locations in the field of view of the AV 100.

The nodes 1006*a-d* are distinct from objects 1008*a-b* which cannot overlap with a node. In an embodiment, when granularity is low, the objects 1008*a-b* represent regions that cannot be traversed by automobile, e.g., areas that have no streets or roads. When granularity is high, the objects 1008*a-b* represent physical objects in the field of view of the AV 100, e.g., other automobiles, pedestrians, or other entities with which the AV 100 cannot share physical space. In an embodiment, some or all of the objects 1008*a-b* are a static objects (e.g., an object that does not change position such as a street lamp or utility pole) or dynamic objects (e.g., an object that is capable of changing position such as a pedestrian or other car).

The nodes 1006*a-d* are connected by edges 1010*a-c*. If two nodes 1006*a-b* are connected by an edge 1010*a*, it is possible for an AV 100 to travel between one node 1006*a* and the other node 1006*b*, e.g., without having to travel to an intermediate node before arriving at the other node 1006*b*. (Referring to an AV 100 traveling between nodes, means that the AV 100 travels between the two physical positions represented by the respective nodes.) The edges 1010*a-c* are often bidirectional, in the sense that an AV 100 travels from a first node to a second node, or from the second node to the first node. In an embodiment, edges 1010*a-c* are unidirectional, in the sense that an AV 100 can travel from a first node to a second node, however the AV 100 cannot travel from the second node to the first node. Edges 1010*a-c* are unidirectional when they represent, for example, one-way streets, individual lanes of a street, road, or highway, or other features that can only be traversed in one direction due to legal or physical constraints.

In an embodiment, the planning module 404 uses the directed graph 1000 to identify a path 1012 made up of nodes and edges between the start point 1002 and end point 1004.

An edge 1010*a-c* has an associated cost 1014*a-b*. The cost 1014*a-b* is a value that represents the resources that will be expended if the AV 100 chooses that edge. A typical resource is time. For example, if one edge 1010*a* represents a physical distance that is twice that as another edge 1010*b*, then the associated cost 1014*a* of the first edge 1010*a* may be twice the associated cost 1014*b* of the second edge 1010*b*. Other factors that affect time include expected traffic, number of intersections, speed limit, etc. Another typical resource is fuel economy. Two edges 1010*a-b* may represent the same physical distance, but one edge 1010*a* may require more fuel than another edge 1010*b*, e.g., because of road conditions, expected weather, etc.

When the planning module 404 identifies a path 1012 between the start point 1002 and end point 1004, the planning module 404 typically chooses a path optimized for cost, e.g., the path that has the least total cost when the individual costs of the edges are added together.

Autonomous Vehicle Control

Figure 11:
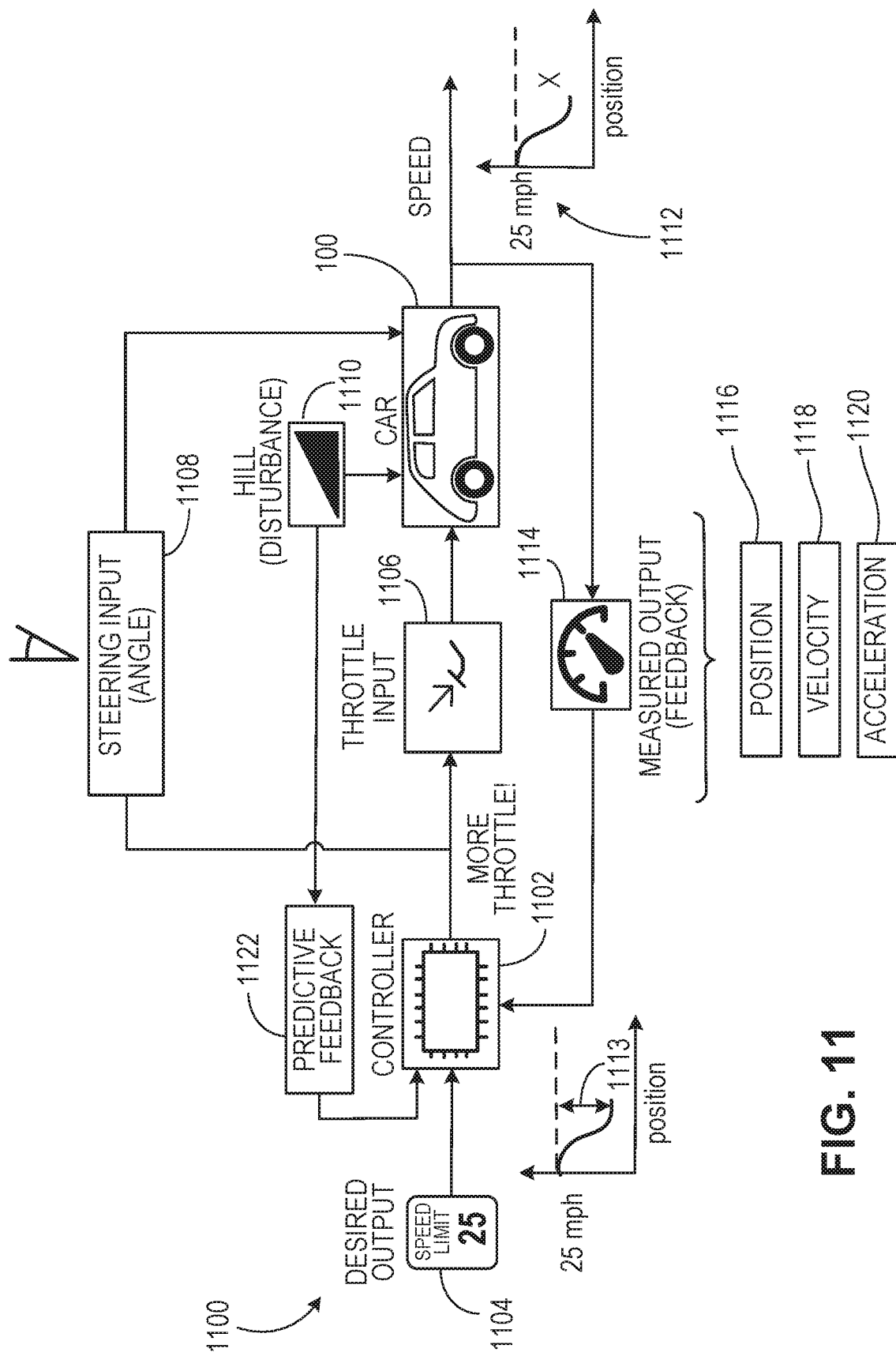
FIG. 11 shows a block diagram of the inputs and outputs of a control module.

FIG. 11 shows a block diagram 1100 of the inputs and outputs of a control module 406 (e.g., as shown in FIG. 4). A control module operates in accordance with a controller 1102 which includes, for example, one or more processors (e.g., one or more computer processors such as microprocessors or microcontrollers or both) similar to processor 304, short-term and/or long-term data storage (e.g., memory random-access memory or flash memory or both) similar to main memory 306, ROM 1308, and storage device 210, and instructions stored in memory that carry out operations of the controller 1102 when the instructions are executed (e.g., by the one or more processors).

In an embodiment, the controller 1102 receives data representing a desired output 1104. The desired output 1104 typically includes a velocity, e.g., a speed and a heading. The desired output 1104 can be based on, for example, data received from a planning module 404 (e.g., as shown in FIG. 4). In accordance with the desired output 1104, the controller 1102 produces data usable as a throttle input 1106 and a steering input 1108. The throttle input 1106 represents the magnitude in which to engage the throttle (e.g., acceleration control) of an AV 100, e.g., by engaging the steering pedal, or engaging another throttle control, to achieve the desired output 1104. In some examples, the throttle input 1106 also includes data usable to engage the brake (e.g., deceleration control) of the AV 100. The steering input 1108 represents a steering angle, e.g., the angle at which the steering control (e.g., steering wheel, steering angle actuator, or other functionality for controlling steering angle) of the AV should be positioned to achieve the desired output 1104.

In an embodiment, the controller 1102 receives feedback that is used in adjusting the inputs provided to the throttle and steering. For example, if the AV 100 encounters a disturbance 1110, such as a hill, the measured speed 1112 of the AV 100 is lowered below the desired output speed. In an embodiment, any measured output 1114 is provided to the controller 1102 so that the necessary adjustments are performed, e.g., based on the differential 1113 between the measured speed and desired output. The measured output 1114 includes measured position 1116, measured velocity 1118, (including speed and heading), measured acceleration 1120, and other outputs measurable by sensors of the AV 100.

In an embodiment, information about the disturbance 1110 is detected in advance, e.g., by a sensor such as a camera or LiDAR sensor, and provided to a predictive feedback module 1122. The predictive feedback module 1122 then provides information to the controller 1102 that the controller 1102 can use to adjust accordingly. For example, if the sensors of the AV 100 detect ("see") a hill, this information can be used by the controller 1102 to prepare to engage the throttle at the appropriate time to avoid significant deceleration.

Figure 12:
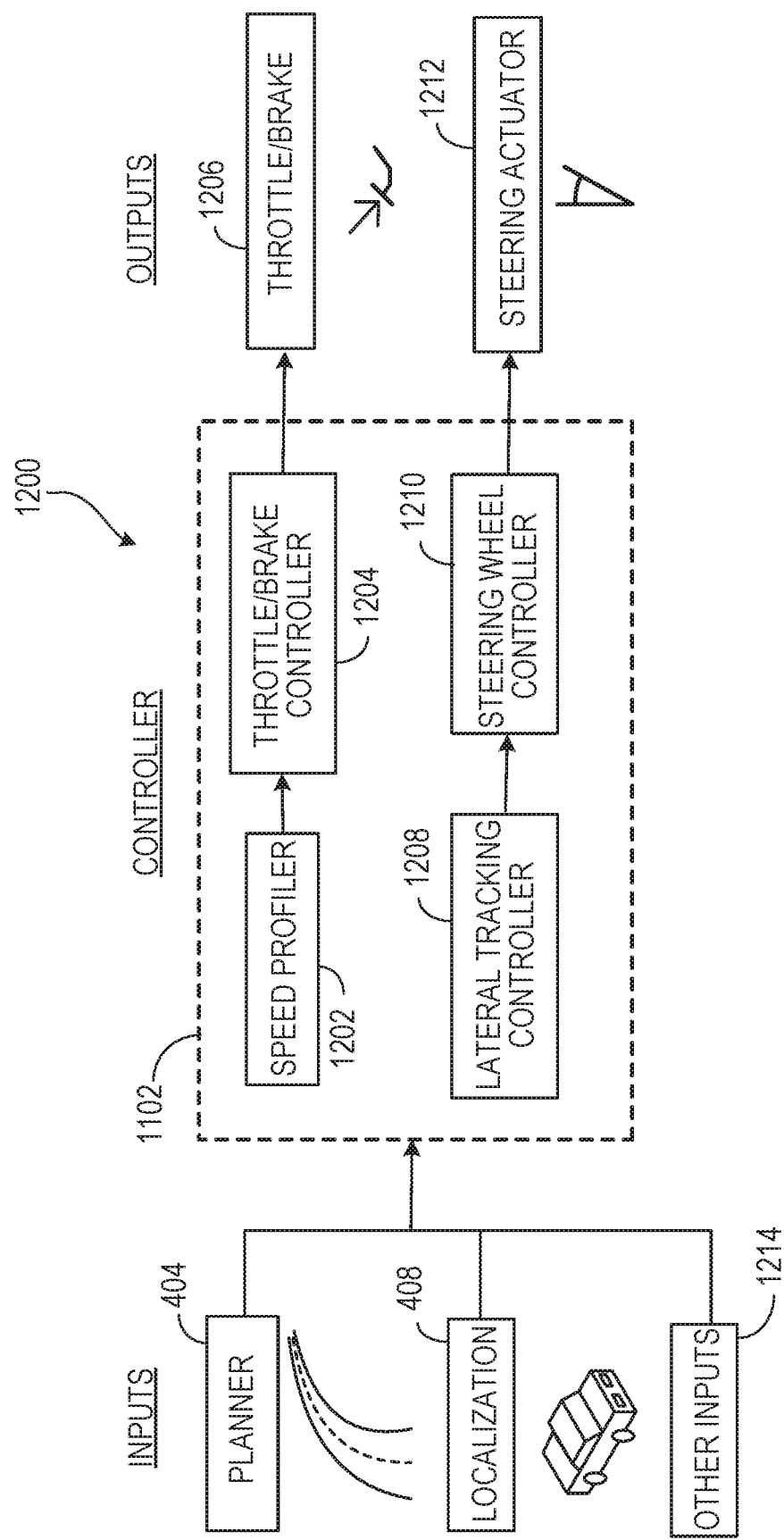
FIG. 12 shows a block diagram of the inputs, outputs, and components of a controller.

FIG. 12 shows a block diagram 1200 of the inputs, outputs, and components of the controller 1102. The controller 1102 has a speed profiler 1202 which affects the operation of a throttle/brake controller 1204. For example, the speed profiler 1202 instructs the throttle/brake controller 1204 to engage acceleration or engage deceleration using the throttle/brake 1206 depending on, e.g., feedback received by the controller 1102 and processed by the speed profiler 1202.

The controller 1102 also has a lateral tracking controller 1208 which affects the operation of a steering controller 1210. For example, the lateral tracking controller 1208 instructs the steering controller 1210 to adjust the position of the steering angle actuator 1212 depending on, e.g., feedback received by the controller 1102 and processed by the lateral tracking controller 1208.

The controller 1102 receives several inputs used to determine how to control the throttle/brake 1206 and steering angle actuator 1212. A planning module 404 provides information used by the controller 1102, for example, to choose a heading when the AV 100 begins operation and to determine which road segment to traverse when the AV 100 reaches an intersection. A localization module 408 provides information to the controller 1102 describing the current location of the AV 100, for example, so that the controller 1102 can determine if the AV 100 is at a location expected based on the manner in which the throttle/brake 1206 and steering angle actuator 1212 are being controlled. In an embodiment, the controller 1102 receives information from other inputs 1214, e.g., information received from databases, computer networks, etc.

Object Tracking

As mentioned above, tracking is a challenging problem because targets can move and vary in number. Also, measurements from sensors have noise and uncertain origins. The single target filtering problem has a Bayesian solution in a recursive form. To generalize to the multi-target case, the Random Finite Set (RFS) framework can be used.

Single-Target Tracking

Due to the possibility of missed detections and measurements that are clutter, even single target tracking has to be considered in the framework of multi-target tracking. However, assuming that the target is always observed with a unique measurement, the filtering problem can be solved as follows.

Let x represent the target kinematic state. The motion model can be specified by an equation:

$$x_{k+1}=f(x_k)+v_k,$$

or equivalently, and with a recycled use of f, by the transition density:

$$f(x_{k+1}|x_k).$$

The measurement model can be specified by the equation:

$$z_k=g(x_k)+w_k,$$

or equivalently by the likelihood density:

$$g(z_k|x_k).$$

One objective of filtering is to obtain the posterior target density given all available measurements, $p_{k|k}(x_k|Z_{1:k})$. This can be solved recursively in two steps: the prediction step $$p_{k|k-1}(x_k|z_{1:k-1}) = \int f(x_k|\xi)p_{k-1|k-1}(\xi|z_{1:k-1})d\xi,$$

and the update step $$p_{k|k}(x_k|z_{1:k}) = \frac{g(z_k|x_k)p_{k|k-1}(x_k|z_{1:k-1})}{\int g(z_k|\xi)p_{k|k-1}(\xi|z_{1:k-1})d\xi},$$

where the denominator is the normalizing constant $p(z_{1:k})$.

The above equations give values of the posterior at any given point $x_k$. To make practical use of the distribution, finite parameterization of the posterior can be used. When both motion and measurement models are linear and Gaussian, and the initial density is Gaussian, then the predicted and posterior densities are Gaussian, in which only the evolution of the mean $\bar{x}_k$ and the covariance $P_k$ need to be maintained. For nonlinear, non-Gaussian cases, the solution can be approximated with a mixture of Gaussians or particles.

Multi-Target Tracking

One solution is to assume that the information contained in all measurements is summarized in a posterior density that can be computed recursively as data is collected. Defining a "global state" $X_k$ to represent all targets, and a "global measurement" $Z_k$ to represent all measurements, then a filtering solution can be described in the following form:

$$p_{k|k-1}(X_k|Z_{1:k-1}) = \int f(x_k|\Xi)p_{k-1|k-1}(\Xi|Z_{1:k-1})\mu(d\Xi),$$

$$p_{k|k}(X_k|Z_{1:k}) = \frac{g(Z_k|X_k)p_{k|k-1}(X_k|Z_{1:k-1})}{\int g(Z_k|\Xi)p_{k|k-1}(\Xi|Z_{1:k-1})\mu(d\Xi)}.$$

Since targets and measurements do not have intrinsic ordering, $X_k$ and $Z_k$ take the form of a set of individual target state vectors and individual measurements respectively, and the set is finite. A mathematical framework can be provided to characterize a random variable taking a value of such a set, and its probability distribution. Using portions of B. N. Vo, S. Singh, and A. Doucet, "Sequential Monte Carlo methods for multitarget filtering with random finite sets," IEEE Transactions on Aerospace and Electronic Systems, 41(4):1224-1245 (October 2005), let E be the space of a single target state, and let F be the collection of finite subsets of E (so F a set of sets). Let $(\Omega, \sigma(\Omega), P)$ be the probability space. Then a random finite set $\Xi$ maps a sample in $\Omega$ to a set in F(E), and its probability distribution $P_\Xi$ for a subset $T \subseteq F(E)$ is defined as:

$$P_\Xi(\mathcal{T}) = P(\Xi^{-1}(\mathcal{T})) = P(\{\omega : \Xi(\omega) \in \mathcal{T}\}).$$

For a random scalar, this subset takes the form of an interval $(-\infty, x]$. However, in some circumstances, this form is not convenient to use for constructing multi-target motion models and measurement models from single target motion models. An alternative form of defining the probability distribution of an RFS is given by the belief mass function $\beta_\Xi$ defined for any closed subset (noting the absence of a quantifier "finite") $S \subseteq E$:

$$\beta_\Xi(S) = P(\{\omega : \Xi(\omega) \subseteq S\}).$$

From this, the multi-target motion transition density and measurement likelihood are defined through the use of Finite Set Statistics (FISST) (see Ronald Mahler, "Random Set Theory for Target Tracking and Identification," Handbook of Multisensor Data Fusion: Theory and Practice, David L. Hall and James Llinas, editors, CRC Press, 2nd edition (2008)) with set derivatives and set integrals, so that the multi-target posterior can be obtained through the recursion:

$$\pi_{k|k-1}(X_k|Z_{1:k-1}) = \int \varphi_{k|k-1}(X_k|\Xi)\pi_{k-1|k-1}(\Xi|Z_{1:k-1})\delta\Xi,$$

$$\pi_{k|k}(X_k|Z_{1:k}) = \frac{\rho_k(Z_k|X_k)\pi_{k|k-1}(X_k|Z_{1:k-1})}{\int \rho_k(Z_k|\Xi)\pi_{k|k-1}(\Xi|Z_{1:k-1})\delta\Xi}.$$

The above multi-target filter solves the multi-target tracking problem, so in this context "filter" and "tracker" are synonymous. Sometimes "filter" is used to mean "single target filter," and "tracker" is used to mean "multi-target filter."

The general multi-target posterior distribution is very complex and often computationally intractable. Thus approximations are made. Below are two possible approaches.

The first approach is to maintain and propagate only the first moment of the distribution (which is called Probability Hypothesis Density (PHD)) (see Ronald P. S. Mahler, "Multitarget Bayes filtering via first-order multitarget moments," Aerospace and Electronic Systems, IEEE Transactions on, 39(4): 1152-1178 (October 2003)). The mean is defined not directly by adding sets of different cardinalities, but through a counting measure, such that the integral of the PHD "surface" over any given "area" in the space of the single target state gives the expected number of targets in that area. There is also the Cardinalized PHD (CPHD) filter that adds a tighter estimation of the total number of targets (see R. Mahler, "PHD filters of higher order in target number," Aerospace and Electronic Systems, IEEE Transactions on, 43(4): 1523-1543 (October 2007)).

The second approach is to work with a subclass of distributions that are closed under prediction and update, in the same way that Gaussians are closed for "linear Gaussian" systems. The Generalized Labeled Multi-Bernoulli (GLMB) is one such class (see Ba N. Vo, Ba-Tuong Vo, and Hung Hoang, "An Efficient Implementation of the Generalized Labeled Multi-Bernoulli Filter," IEEE Transactions on Signal Processing, 65(8):1975-1987 (April 2017)), and is described in greater detail below.

The goal is to estimate jointly a continuous kinematic state and a discrete state that can include target type, motion, etc. First, a general formula is described to achieve this, along with an implementation that takes advantage of independence to provide efficiency. The implementation includes a generic library that can allow different choices of the components of the discrete state; adding a particular attribute does not require significant changes.

After that, a track point is defined that has a joint distribution over the continuous and discrete states, which is referred to as a track. Each track point also has a label, or track ID. A set of such tracks forms a hypothesis, which implicitly contains how measurements are associated with tracks at the given time. One parent hypothesis gives rise to a set of children hypotheses, and therefore a hypothesis implicitly contains an association history. The class of GLMB is a set of hypotheses with weights that sum to one.

For practical computation, there is often a large number of hypotheses. The Merging and Splitting algorithm described below makes GLMB filters viable.

Tracking with Kinematic and Discrete States

For linear Gaussian systems, the filtering density of the kinematics state is Gaussian, and is obtained by Kalman Filtering. When this state is augmented with discrete valued modes (for motion) and attributes (for identity, intention, etc.), the filtering density, conditioned on the discrete part, is multimodal in general. To handle the complexity, approximation schemes such as Interacting Multiple Models are often used. Discussed below is the general solution for nonlinear non-Gaussian systems, and how IMM approximation is obtained. The literature includes papers on IMM for linear Gaussian systems (e.g., X. Rong Li and V. P. Jilkov, "Survey of maneuvering target tracking," Part V, Multiple-model methods, IEEE Transactions on Aerospace and Electronic Systems, 41(4): 1255-1321 (October 2005); and H. A. P. Blom and Y. Bar-Shalom, "The interacting multiple model algorithm for systems with Markovian switching coefficients," Automatic Control, IEEE Transactions on, 33(8): 780-783 (August 1988)), and papers (e.g., Yuthika Punchihewa, Ba-Ngu Vo, and Ba-Tuong Vo, "A Generalized Labeled Multi-Bernoulli filter for maneuvering targets," 2016 19th International Conference on Information Fusion (FUSION), pages 980-986, IEEE (July 2016)) that specify an exact solution for nonlinear systems without giving a concrete algorithm for approximations.

Kinematics Only

The predicted density is given by $$P_{k|k-1}(x) = \int f(x|\xi)P_{k-1}(\xi)d\xi,$$

where P inside the integral is a probability density, and track birth and death are not considered. Given a motion model f (.|.), define a predictor operator Pred that maps the prior density to the predicted density:

$$P_{k|k-1}(x) = \text{Pred}_f[P_{k-1}(\bullet)](x).$$

The updated density, dropping time subscripts, is given by $$P(x|z) = \frac{L(z|x)P(x)}{P(z)} = \frac{L(z|x)P(x)}{\int L(z|\xi)P(\xi)d\xi},$$

where $L(\bullet|\bullet)$ is sensor likelihood. Defining an update operator Updt that maps a (predicted) density to a posterior density, the operator also produces the likelihood of the measurement $P(z)$, denoted by $\eta$:

$$P(x|z) = \text{Updt}_L[P(\bullet)](x), P(x) = \eta.$$

The following uses this identity:

$$L(z|x)P(x) = \eta \text{Updt}_L[P(\bullet)](x). \quad (1)$$

Kinematics and Modes/Attributes

Now, consider the augmented state (x, i) where i is discrete and, without loss of generality, takes values in a set of natural numbers. In implementation, i can take the form of a tuple, e.g., $(m_1, m_2)$ where for example $m_1$ is the index of the motion mode, and $m_2$ is the index of object (e.g., vehicle) color. Use the conditional decomposition $$P(x, i) = P(x|i)P(i) \triangleq P(x|i)q(i),$$

and consider the distribution over the augmented state as an array of kinematic distributions (or a map from discrete symbols to such distributions) weighted by the marginal probabilities. In the following, the joint distribution is derived first, and then the marginal distributions and conditional distributions are obtained through the relationship $$q(i) = \int P(x, i)dx, \; P(x|i) = \frac{P(x, i)}{q(i)}.$$

Semi-Markov Transitions

In the following, measurements carry arbitrary time stamps, and therefore the elapsed time between two instants $$\delta_t = t_k - t_{k-1}$$

can be non-uniform. The kinematic prediction and update can take this into account. For the mode transitions, the semi-Markov model is adopted. For a given mode with a (long term) transition probability matrix $[\pi_{ij}]$, assume that the component i has a transition rate $\lambda_i$, such that $$P(m_k = j \ne i | m_{k-1} = i, t_k - t_{k-1} = \delta_t) = \pi_{ij}(1 - e^{-\lambda_i \delta_t}),$$

and the probability of not transitioning away is the complement to unity. For simplicity, the following assumes that the short term transition probabilities have been calculated as above according to $\delta_t$ and parameter $\lambda_i$, and denote them again as $\pi_{ij}$. Note that $\pi_{k|k}$ was used previously to denote the FISST posterior density and should not be confused with the numbers $\pi_{ij}$ here.

Prediction

Following a jump Markov set up, define a transition matrix with probability of transition from row i to column j as $\pi_{ij} \triangleq q(j|i)$. First, the discrete state (also called mode) transitions to a new value. Then the motion happens under the new mode. Thus, the predicted density is given by $$P_{k|k-1}(x, i) = \int f(x, i|\xi, i)q(i|j)P_{k-1}(\xi, j)d[\xi; j]$$

$$= \sum_j \int f(x|\xi, i)\pi_{ji}P_{k-1}(\xi|j)q_{k-1}(j)d\xi,$$

$$= \sum_j \pi_{ji}q_{k-1}(j) \int f(x|\xi, i)P_{k-1}(\xi|j)d\xi,$$

$$\triangleq \sum_j \pi_{ji}q_{k-1}(j)\text{Pred}_i[P_{k-1}(\cdot|j)](x),$$

where $\text{Pred}_i$ denotes the predictor operator defined by the motion model in the i-th mode. Thus the marginal distributions are $$q_{k|k-1}(i) = \int P_{k|k-1}(x, i)dx = \sum_j \pi_{ji}q_{k-1}(j),$$

and the conditional distributions are $$P_{k|k-1}(x|i) = \sum_j \frac{\pi_{ji}q_{k-1}(j)}{q_{k|k-1}(i)}\text{Pred}_i[P_{k-1}(\cdot|j)](x) \triangleq \sum_j \mu_{ji}P_{ji}^-(x). \quad (2)$$

Updating

Let the predicted density be parameterized as $$P^-(x|i)q^-(i).$$

The posterior is given by $$P^+(x, i|z) = \frac{L(z|x, i)P^-(x|i)q^-(i)}{\sum_j \int L(z|\xi, j)P^-(\xi|j)q^-(j)d\xi} \quad (3)$$

$$= \frac{q^-(i)\eta_{ii}\text{Updt}_i[P^-(\cdot|i)](x)}{\sum_j q^-(j)\eta_{jj}\text{Updt}_j[P^-(\cdot|j)](\xi)d\xi}$$

$$= \alpha_i \text{Updt}_i[P^-(\cdot|i)](x)$$

where in the second step the identity described by Equation (1) is used, $\eta_{ii}$ is the measurement probability density from the update of the i-th mode $P^-(\bullet|i)$ using the likelihood $L(z|; i)$ conditioned on the i-th mode, and $$\alpha_i \triangleq \frac{q^-(i)\eta_{ii}}{\sum_j q^-(j)\eta_{jj}} \triangleq \frac{q^-(i)\eta_{ii}}{P(z)}.$$

Thus, the posterior marginals and conditionals are given by $$q^+(i|z) = \int P^+(x, i|z)dx = \alpha_i, \quad (4)$$

$$P^+(x|i, z) = Updt_i[P^-(\cdot|i)](x). \quad (5)$$

If z is independent of x conditioned on the mode i, e.g., when z is a direct measurement of i, then the likelihood can be summarized in a confusion matrix with entries $$L(z|x,i)=L(z|i) \triangleq c_{iz}.$$

In such a case $\eta_{ii}=c_{iz}$, and the posterior kinematic density in (5) is unchanged from the predicted, i.e., $P^+(\cdot|i, z)=P^-(\cdot|i)$.

Each component $P^-(\cdot|i)$ in the predicted density is itself a sum of subcomponents $\{P_{ji}^-\}$ as a result of prediction, and its update has the same structure as demonstrated by Equation (3). Let $$Updt_i[P_{ji}^-(\cdot)]=P_{jii}^+(\cdot) \text{ with } P(z)=\eta_{jii},$$

where the triple subscripts mean that the j-th component in the prior is predicted by the i-th motion model, and subsequently updated by the i-th likelihood model. Then, $$Updt_i[P^-(\cdot|i)] = \sum_j \frac{\mu_{ji}\eta_{jii}}{\eta_i} P_{jii}^+(\cdot) \text{ with } \eta_i = \sum_j \mu_{ji}\eta_{jii}.$$

Substituting into (4) and (5) provides, at time k, $$q_k(i|z) = \frac{q_{k|k-1}(i)\sum_j \mu_{ji}\eta_{jii}}{\sum_j q_{k|k-1}(s)\sum_j \mu_{js}\eta_{jss}} \quad (6)$$

$$P_k(\cdot|i, z) = \sum_j \frac{\mu_{ji}\eta_{jii}}{\eta_i} Updt_i[Pred_i[P(\cdot|j)]](\cdot) \quad (7)$$

Exact Solutions

Suppose that there are N modes for the discrete state. If the starting distribution of a mode is Gaussian, then Equation (7) provides that after one prediction-update cycle, each mode is a mixture of Gaussian. Hence a single Gaussian is not closed under these two operations, and one would have to substitute the mixture with a single Gaussian approximation to continue the recursion.

In theory, a Gaussian mixture distribution for a mode is closed, and so is a particle distribution. If the starting mode is a sum of M Gaussians, then after one cycle a mode would be a sum of MN Gaussians, and after that, $MN^2$ Gaussians. Likewise, if the starting mode is a particle distribution with M particles, then after one cycle a mode would have M N particles, and after that, M $N^2$ particles.

Single Gaussian

To maintain the recursion with a single Gaussian for a mode, the sum of Gaussians is approximated by a moment matched Gaussian.

According to H. A. P. Blom and Y. Bar-Shalom, "The interacting multiple model algorithm for systems with Markovian switching coefficients," Automatic Control, IEEE Transactions on, 33(8):780-783 (August 1988), when the approximation is done after the prediction step, i.e., after Equation (2), it is the IMM algorithm; when the approximation is done after the prediction step, i.e., after Equation (7), then it is the GPB2 (Generalized Pseudo Bayes) algorithm.

Mixture of Gaussian

To maintain the recursion with a mixture of Gaussians with a given number of components, an algorithm is used that approximates a large Gaussian mixture with a small one. In some embodiments, simply discarding smaller weights from the union is insufficient, because the weights may be close to each other and their sum would yield a bigger Gaussian component that should be kept. To maintain the recursion with a particle distribution with a given number of particles, an algorithm is used that approximates a large set of particles with a small one.

Implementation

The disclosure above used a generic index i to represent the value of the current discrete state vector. In some embodiments, a tuple (i, j, k) is used, where, for example, i represents the motion mode (e.g., going straight or turning), j represents the folded segment in range-rate measurement (e.g., in MRR3 radar), and k represents color for the sake of illustration. In some embodiments, motion prediction is dependent upon motion mode but independent of color. Taking advantage of such independence presents some challenges.

For one, the RFS Radar Tracker may be written as a generic library that can be used to construct an instantiation of a tracker based on the choice of models and sensors. The kinematic state, for a point target, may be hard coded as consisting of position and velocity (in 2D or 3D). The discrete state may not be hard coded, such that it can have any chosen number of components, and is indexed by a tuple.

Secondly, suppose two motion predictors are added to predict the target state at the next instant, one corresponding to a "small q" that is suitable for tracking straight-going targets, and the other corresponding to "large q" that is suitable for tracking turning targets. It is desirable to write them independently of how many other components the discrete state has and their relative order. In other words, if later on a component is added and the tuple representation is changed from (i, j, k) to (i, j, k, s), it is not desirable modify code (e.g., a program) written for the two predictors.

Thirdly, conditional independence can be applied in graphical models such as Bayesian Networks, but the tracking literature on discrete states (e.g., IMM, classifications, and attributes) does not go beyond the generic formula that sums over all indices.

Lastly, the user of the library may know which tuple element represents which attribute, and the independence properties of various models. It is desirable for the library to provide an easy way for the user to encode this knowledge, and to conduct the computations in an efficient way.

In some embodiments, sensor data is filtered (e.g., using a computer program) according to the approach described below to track multiple objects.

In some embodiments, first, a summation over all indices is kept to ensure algorithm correctness. Second, computation saving is achieved through caching. For example, if motion prediction is dependent upon only the first component (for motion mode), then the same predictor is used in the summation whether conditioned on (0, 0, 0) or conditioned on (0, 1, 2). Thus, the cached result can be re-used instead of being computed again. Third, the term "the same object" means the same object in memory, not just two objects having the same value. This can be achieved by the combination of a look up function and a dictionary. Using the example in the previous paragraph, the look up function, when given (0, 1, 2) as input, will return (0, 0, 0), which corresponds to an item directly saved into the dictionary.

Predictors and Updaters

Each "unique" tuple corresponds to a value taken by the discrete state vector, which in turn decides what predictor object to instantiate. In some embodiments, an updater performs Bayesian update, and therefore it has to be specified by both the measurement type and the discrete state value. In some embodiments, the cache is cleared at the beginning of each cycle of filtering with a measurement frame. When the same predictor (for different mode tuples) is called to predict the same kinematic distribution to the same time, the cached value is retrieved and returned.

Hypotheses Merging and Splitting in GLMB Filtering

Figure 13A:
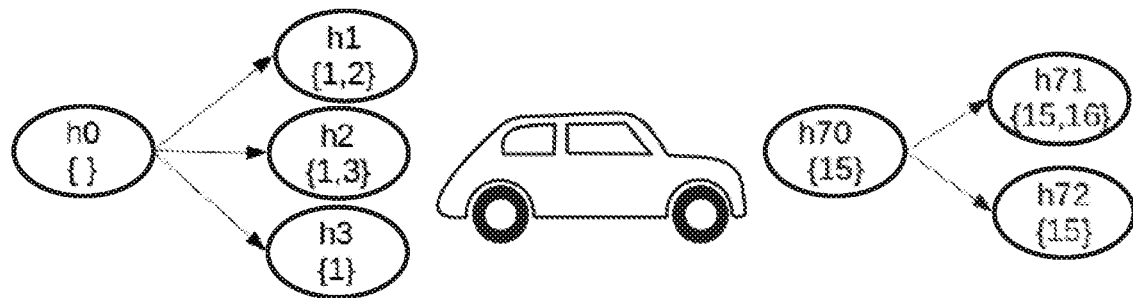
FIGS. 13A-13B show exemplary hypotheses for a tracker, according to some embodiments.
Figure 13B:
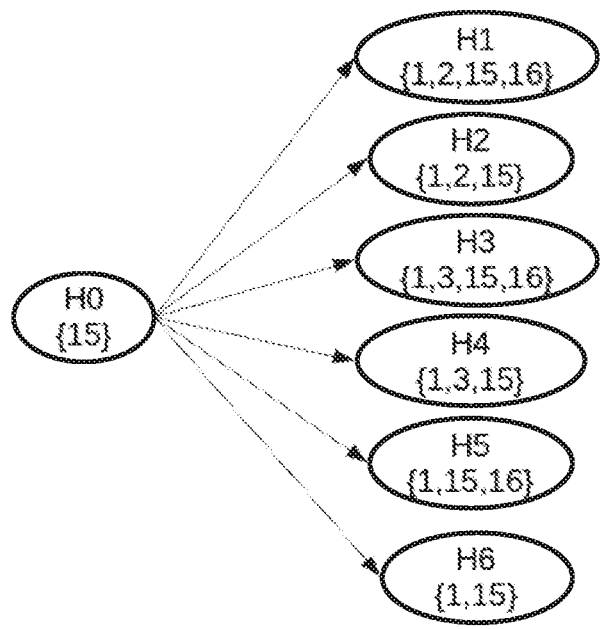

The following techniques for multi-target tracking adopt the framework of Labeled Random Finite Set (L-RFS) filtering, and more specifically use the δ-Generalized Labeled Multi Bernoulli (dGLMB) filter described in Ba N. Vo, Ba-Tuong Vo, and Hung Hoang, "An Efficient Implementation of the Generalized Labeled Multi-Bernoulli Filter," IEEE Transactions on Signal Processing, 65(8): 1975-1987 (April 2017). In some embodiments, the implementation of the dGLMB filter enumerates top ranked hypotheses. For example, a computation budget can be set in terms of the total number of hypotheses to keep in memory (e.g., based on computer resources). Consider a situation where the state space of interest can be decomposed into subsets such that targets in each set are statistically independent of those in other sets. For example, one tracker can be run for targets in front of a vehicle, and another tracker can be run for targets behind the vehicle, with m and n hypotheses, respectively. If only one tracker is run for the entire scene, the total number of hypotheses would be mn, as illustrated in FIGS. 13A and 13B.

The algorithm described below dynamically decides how the whole space should be decomposed, including whether and how the hypotheses are split and merged. In some circumstances, the approach below provides improved accuracy compared to, e.g., the approach proposed in Stephan Reuter, Ba-Tuong Vo, Ba-Ngu Vo, and Klaus Dietmayer, "The Labeled Multi-Bernoulli Filter," IEEE Trans. Signal Processing, 62(12):3246-3260 (2014) based on Labeled Multi Bernoulli (LMB), and is more algorithmically concrete (and potentially more accurate) than the algorithm summarily described in M. Beard, B. Tuong Vo, and B. N. Vo, "A Solution for Large-scale Multi-object Tracking," ArXiv e-prints (April 2018) that operates directly on dGLMB.

In some embodiments, the entire RFS distribution is represented as a product of marginal distributions, each having a distinct label set (e.g., set of tracks or set of track IDs), and a spatial extent that is far enough from each other (e.g., the spatial extent meets a distance threshold, condition, or criteria). Each marginal distribution is represented by a set of hypotheses. The term "factor" is used to denote the marginal distribution, the label subset (e.g., subset of tracks or subset of track IDs), the spatial extent, and the subset of hypotheses.

Two factors "interacts" with each other when a measurement or track associated with one factor is also associated with a measurement or track in the other partition. When factors "interact" through gating with the same frame of measurements, they are merged by forming the product of the marginal distributions, which corresponds to enumeration of combinations of constituent hypotheses. Whenever possible (e.g., when a specified condition is met), the merged factor is split into two smaller factors, with one of the smaller factors gating with the measurements, the other not. Lastly, the gated factor is updated accordingly.

The LMB Approach

As is seen in FIG. 13A, a track (represented by a track label) can be in several hypotheses. Assuming that a track in each hypothesis has a Gaussian distribution, the LMB approach in Stephan Reuter, Ba-Tuong Vo, Ba-Ngu Vo, and Klaus Dietmayer, "The Labeled Multi-Bernoulli Filter" (IEEE Trans. Signal Processing, 62(12):3246-3260, 2014) collapses the same-labeled tracks into one, with a distribution that is a Gaussian mixture. Ideally, the mixture is at least approximately unimodal, which allows tracks to be clustered into groups. The GLMB distribution is approximated by LMB. GLMB explicitly lists hypotheses, whereas LMB is parameterized by individual tracks with existence probabilities, and hypotheses are explicitly generated only when needed, by running a k-shortest path algorithm for the best k hypotheses.

FIG. 4 in Stephan Reuter, Ba-Tuong Vo, Ba-Ngu Vo, and Klaus Dietmayer, "The Labeled Multi-Bernoulli Filter" (IEEE Trans. Signal Processing, 62(12):3246-3260, 2014) shows the algorithm with splitting and merging. In some embodiments, the approach includes the ability to identify that there should be two factors. The conversions from GLMB to LMB and from LMB to GLMB "waste" accuracies unnecessarily.

The (Vague) GLMB Approach

The approach in M. Beard, B. Tuong Vo, and B. N. Vo, "A Solution for Large-scale Multi-object Tracking" (ArXiv e-prints, April 2018) does not use LMB as an intermediary, and operates directly on GLMB. However, the approach does not describe how to reduce the number of hypotheses to reduce computational burden. This algorithm also loses some accuracy in the marginal to full conversions.

Example Merging and Splitting Algorithm

Consider a probability distribution P (A, B) over two discrete random variables A and B, as shown in FIG. 14A, which shows a table for a generic (joint) distribution. FIG. 14B shows the marginals of the distribution of FIG. 14A. FIG. 14C shows an approximation of the joint distribution using marginals by assuming independence.

The marginals P(A) and P(B) can be obtained by summing over the columns and the rows respectively, as shown in FIG. 14B. If there is indication that A and B are independent (or can be treated as independent without introducing significant error), then an attempt is made to approximate the exact distribution by the reconstruction $$\hat{P}(A,B) \triangleq P(A)P(B),$$

which results in the maximum approximation error $$e_{max} = \max_A \max_B |\hat{P}(A, B) - P(A, B)|$$

For the example in FIGS. 14A-14C, $e_{max}$=0.025. If the error is under an acceptance threshold, then the approximation is accepted and some savings in computation are achieved. Suppose that the cardinalities of the sets of values taken by A and B are $n_A$ and $n_B$, respectively, then instead of keeping $n_A n_B$ entries, only $n_A + n_B$ entries are retained.

In the context of tracking, A represents the "global state" of targets in front of the vehicle, and B represents the global state of targets behind the vehicle. Typically A and B are independent. The following describes how to discretize the values (which include infinite dimensional kinematic distributions) as "$a_i$," and "$b_j$," how to obtain the marginal distributions and the joint distribution, how to cluster the measurements to pair up with A and B, and how to perform measurement update, which may induce merging and splitting.

Factors and Hypotheses

Let X be the whole space operated on, and the distribution over this space be of the dGLMB family, i.e., a set of hypotheses with weights. If X is decomposed into a Cartesian product of $X_A$ and $X_B$, and if independence holds, then the original distribution can be factored into a product of two distributions, each being a set of hypotheses with weights and referred to as a factor. New measurements may couple the factors, in which case the distribution in the product space is constructed to perform measurement update, and factoring is performed again if the resulting error is within tolerance. Thus, once the parameters of gating (for clustering) and approximation are set up, the (changing number of) factors are automatically determined based on implicitly defined subspaces, and they are also merged and split automatically with the arrival of measurements.

In some embodiments, a marginalized distribution has fewer hypotheses, analogous to summing several numbers over columns to get one number.

Figure 15A:
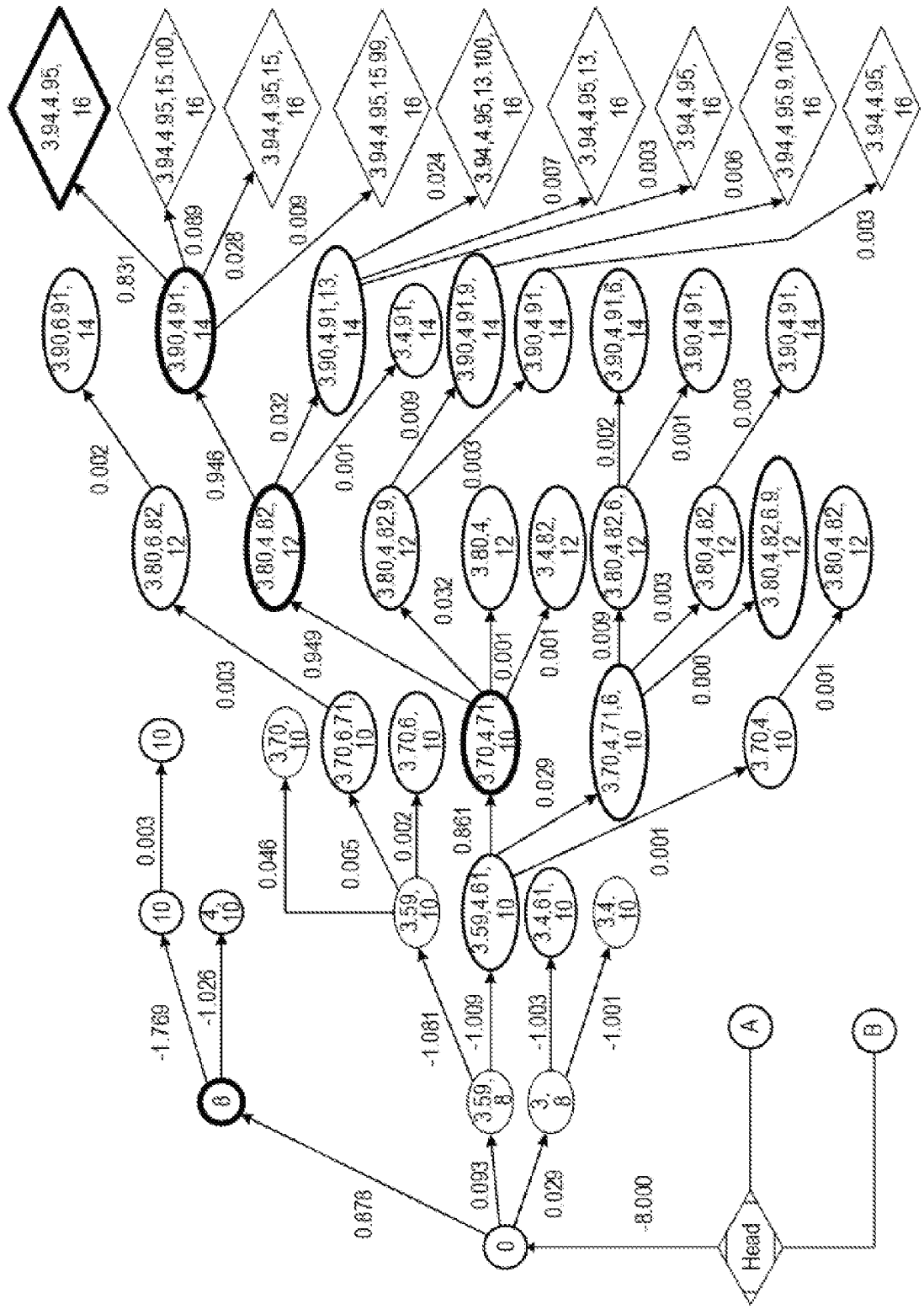
FIGS. 15A-15B show an exemplary hypothesis tree, according to some embodiments.
Figure 15B:
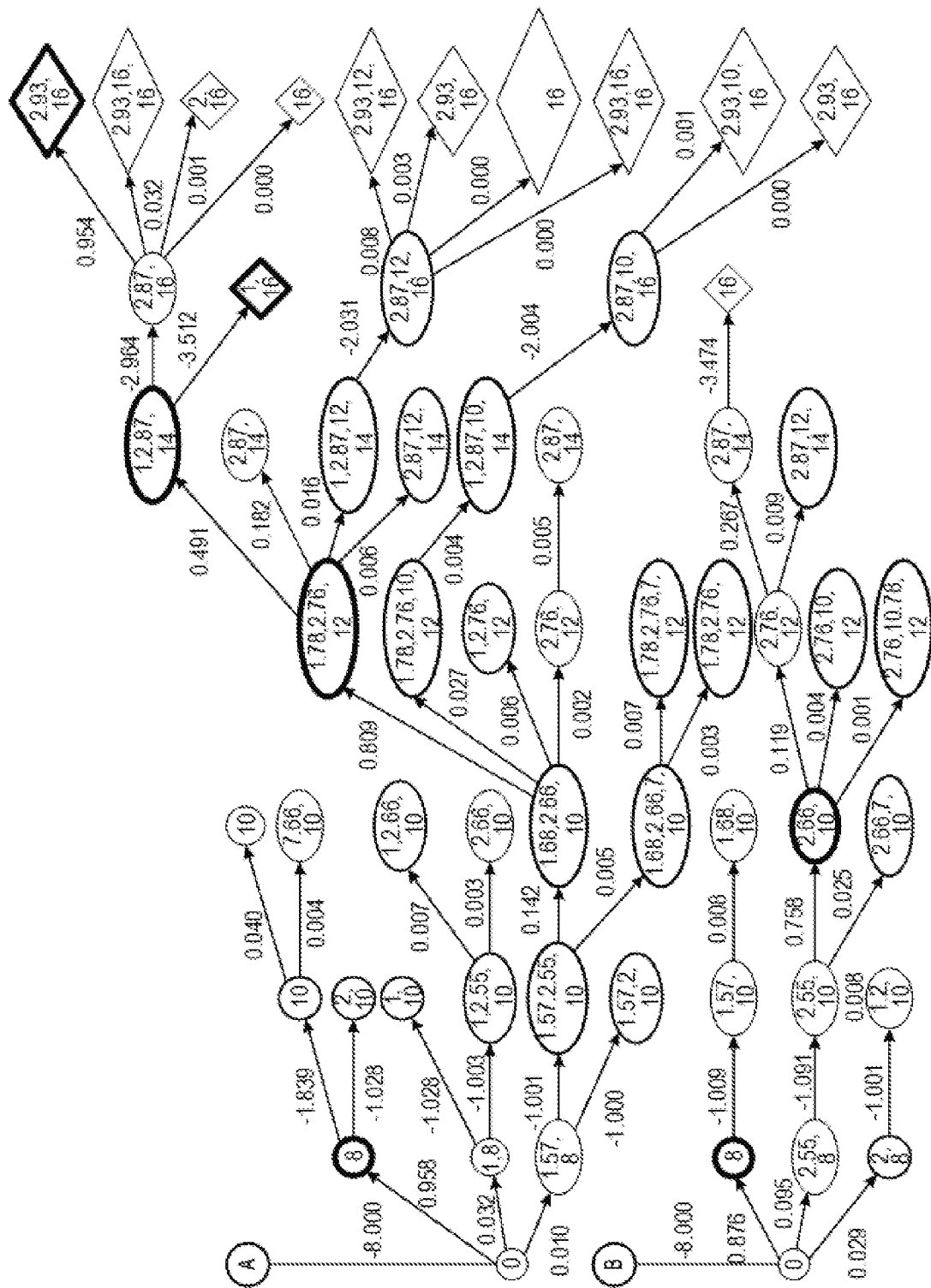

To combine terms that have hypotheses in common, a kinematic distribution is discretized. To do this, first identify a track's kinematic distribution with the set of measurements that have been associated with it. Usually the measurements are such that their effect on state estimation diminish as time goes by. Choose a fixed "history window" length N, and denote the measurements in this window that have been incorporated into the state estimation by a tuple of measurement IDs, with 0 representing a missed detection. FIGS. 15A-15B show an exemplary hypotheses tree with merging (where weights have prefix "−1") and splitting (where weights have prefix "−2" and "−3" for with and without measurements respectively). FIGS. 15A-15B show an example of the evolution of hypotheses for a particular run, where an ellipse represents a hypothesis, the number to the left of a dot represents a track ID, and the number to the right of the dot represents the associated measurement ID. If a window length N=4 is chosen, then the kinematic state distribution for Track 3 in the diamond with bold outlining at the leaf layer is identified with the tuple (70, 80, 90, 94).

Now a hypothesis can be represented with a 2-tuple $(i, S_i)$, where $i \in \mathbb{L}$ is a track ID, and $S_i \subset \mathbb{S}$ is a subset of the measurement IDs.

Figure 15C:
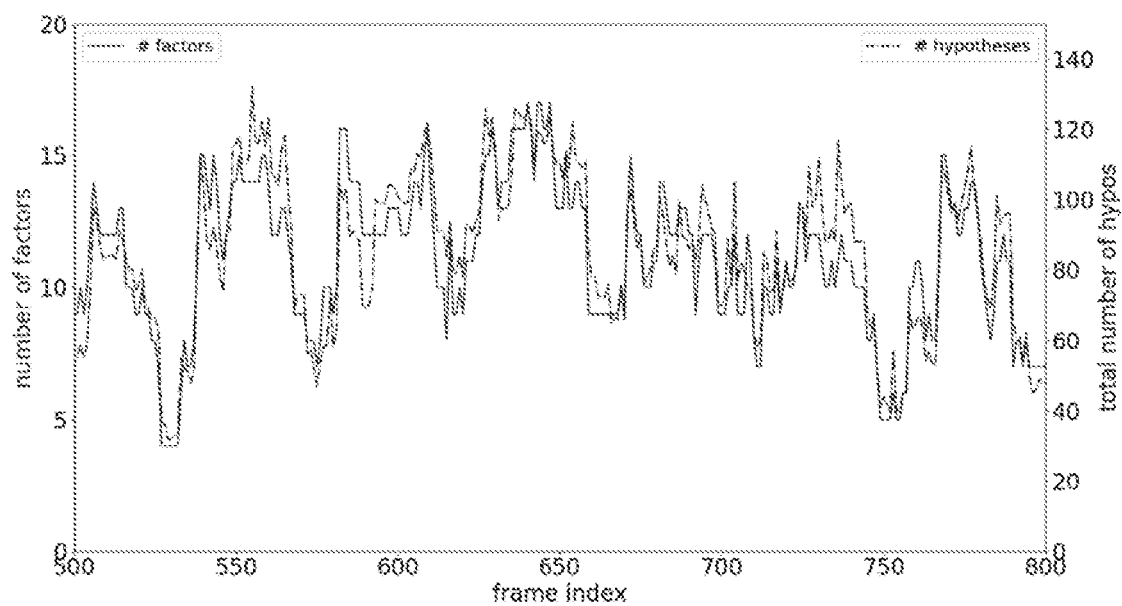
FIG. 15C shows a graph of the number of factors and total number of hypotheses, according to some embodiments.

FIG. 15C shows another aspect of the merge/split techniques described herein. FIG. 15C is a graph showing the number of factors (by the solid line relative to the scale on the left vertical axis) and the total number of hypotheses (by the broken line relative to the scale on the right vertical axis) over the course of collecting frames of measurements (represented on the horizontal axis by frame index). In the illustrated embodiment, the number of factors and the total number of hypotheses generally follow the same trend (e.g., the total number of hypotheses generally increases and decreases as the number of factors increases and decreases, respectively). Notably, for most frames, the number of factors is between 5 and 15 and the total number of hypotheses is between 40 and 120 (e.g., the number of factors and hypotheses does not simply continue to increase over time).

Marginalizations

With hypotheses such represented, two types of marginalizations can be performed: marginalization over remote history and marginalization over a subset of labels (e.g., tracks). In marginalization over remote history, for each "current hypothesis," which is a leaf node shown as a diamond in the hypothesis tree in FIGS. 15A-15B, the pedigree of the hypothesis to the root of the tree is traced and represented as a tuple. The root is not necessarily the "head" in the figure; the head is only the notional root of the "most recent" part of the tree for easy drawing. If the pedigree is truncated to a length of L., then two hypotheses may have two pedigrees with an identical L-tuple. In this case, earlier history is ignored, the two hypotheses are considered identical, and only one hypothesis is kept while adding to its weight the weight of the other (e.g., the hypothesis that is going to be deleted). This is in effect marginalization over remote history.

Claudio Fantacci and Francesco Papi, "Scalable Multisensor Multitarget Tracking Using the Marginalized delta-GLMB Density," IEEE Signal Processing Letters, 23(6): 863-867 (June 2016) effectively considers pedigree of length L=1, e.g., only the leaf nodes are compared. Moreover, the technique in this publication has less granularity in the sense that it does not keep distinct kinematic distributions from marginalized hypotheses, but rather keeps their weighted sum. If each individual kinematic distribution is a Gaussian, then after such a marginalization, a mixture of Gaussian is kept. Thus, when the tracks with the same track ID but in different hypotheses are quite different from each other in terms of position and velocity, managing hypotheses is traded for managing components of the mixture.

As has been described above, hypotheses can be discretized and indexed by 2-tuples. If the label set $\mathbb{L}$ is partitioned into $\mathbb{L} = \mathbb{L}^{(1)} \oplus \mathbb{L}^{(2)}$, then the 2-tuple of a hypothesis can be partitioned into $\{(i, S_i), i \in \mathbb{L}^{(1)}\}$, and $\{(j, S_j)), j \in \mathbb{L}^{(2)}\}$. Subsequently, one set is kept and the other is marginalized by adding the corresponding weights.

When the targets represented by the two sets of labels are far away from each other, as is illustrated in FIG. 13A, it is likely that the total distribution can be approximated well by the product of the marginals, or factors, where the product operation is carried out by enumerating combinations of hypotheses from each marginal. To retain only the top-K weighted global hypotheses, a K-shortest path algorithm can be used (see, e.g., "K shortest path routing," www.wikipedia.org (Sep. 26, 2018)). A vector norm of the difference in weights between the original and the reconstructed can be used as an indicator of how good the approximation is.

Gating and Clustering

In some embodiments, a (coarse) gating function is defined that decides whether a measurement can be associated to a track ID, or to another measurement. Since their time stamps can be different, gating parameters have to consider things like maximum speed. In some embodiments, uncertainty is taken into account, though not necessarily through matrix inversion. The same track ID can be present in more than one hypotheses. In some embodiments, "gating" is defined to be true if a track with the ID in any hypothesis gates.

In some embodiments, a boolean gating matrix is defined between rows of measurements, and columns of tracks plus measurements (which are thought of as virtual tracks). An algorithm is presented in J. Dezert and Y. Bar-Shalom, "Joint probabilistic data association for autonomous navigation" (IEEE Transactions on Aerospace and Electronic Systems, 29(4): 1275-1286, October 1993) to obtain clusters of targets and measurements such that there is no "interference" between different clusters (in terms of gating with the same target/measurement). The algorithm merges (by logical "or") rows that gate with the same track into a group.

Merging and Splitting

After performing the gating and clustering of measurements together with existing tracks, measurement-track groups are obtained. The term "group" is used to avoid confusion with the term "cluster," which is sometimes used in the context of RADAR technology to refer to a frame of data. A group can fall into one of the following three categories: (1) if the group has only a track but no gated measurements, then the group is ignored; (2) if the group has a set of measurements (that gate among themselves) but no gated tracks, then a new factor is created and associated with this set of measurements; and (3) if the group has both measurements and gated tracks, since the tracks (or track IDs) can be present in different factors, then further partitioning is performed to determine how update should be done.

In some embodiments, clustering is performed a second time (e.g., using the same algorithm described above), with measurement group playing the role of measurement, and factor playing the role of track. The measurement group gates with a track, if any track contained in the measurement group is present in any hypothesis contained in the factor. A cluster in the output of the above procedure is referred to as a "super group." If the super group contains factors but no gated measurement groups, then the super group is ignored. Otherwise, a determination is made as to whether merging and splitting is to be performed.

If the super group contains measurement groups but no gated factors, then a new factor is created and associated with the measurements. If the super group contains both factors and gated measurements, then merging is determined as follows: (a) if there is only one factor, then no merging is performed; and (b) if there is more than one factor, then merge the factors.

Given a set of factors, the "top K" weighted cross products of their hypotheses are enumerated, creating one new hypothesis for each product by concatenating the component tracks and multiplying the component weights. This can be done using a K-shortest path algorithm. Due to truncation to "top K," the weights are renormalized. Next, all track IDs and all gated track IDs involved in these hypotheses are collected. If the set difference is not empty, then a determination is made as to whether to perform splitting.

Figure 16:
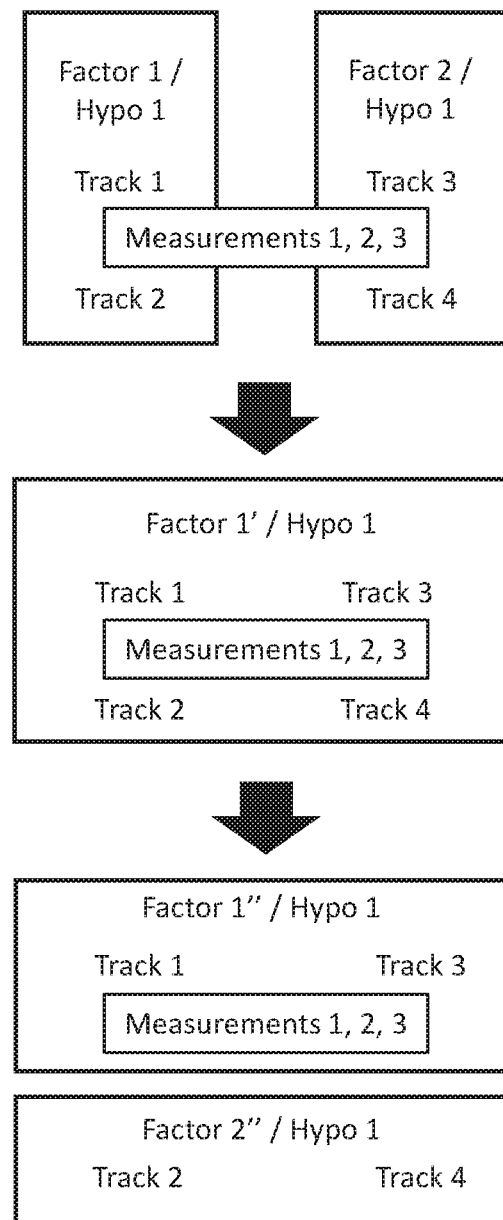
FIG. 16 shows an exemplary splitting process, according to some embodiments.

The process of splitting is illustrated in FIG. 16, where one or more measurements (e.g., Measurements 1, 2, 3) couple two previously independent factors (e.g., Factor 1 and Factor 2), but gate with only some of the tracks in the merged factor (e.g., Factor 1'). In the embodiment illustrated in FIG. 16, Measurements 1, 2, and 3 gate with Track 1 and Track 3, but do not gate with Track 2 or Track 4. In some embodiments, the merged factor is split into two new factors (e.g., Factor 1" and Factor 2") if approximation error is small enough (e.g., the approximation error meets an error condition or is less than a threshold value).

The tracks of each hypothesis (e.g., Hypo 1) are partitioned into the tuples of the gated track IDs (e.g., Track 1 and Track 3), and the track IDs that did not gate (e.g., Track 2 and Track 4). Then all unique gated tracks determine a "row variable," and all unique non-gated tracks determine a "column variable." A table of joint probabilities is constructed in which each hypothesis contributes its weight to an entry, but due to finite history length in discretization, an entry may have multiple contributing hypotheses, so the sum of their weights is entered.

In some embodiments, marginalization is then performed on this table. If the resulting error is acceptable, then independence is assumed to hold and splitting is done. For example, Factor 1' is split into Factor 1" and Factor 2". Each row/column value creates a hypothesis with weight, and these hypotheses create a new factor.

Once the new factors are determined, they are updated with their associated measurements. If there was no merging and no splitting, then the factor is the original factor. If there was merging, but no splitting, then the new factor is one merged factor, with the source factors to be deleted. If there was splitting, then there are at least two new factors, and the source factors are deleted.

Each factor is updated as described above. In some embodiments, for each factor, gating is performed to limit the new tracks to those that gate with the measurements associated with this factor.

Example Process for Detecting Objects and Filtering Sensor Data

Figure 17:
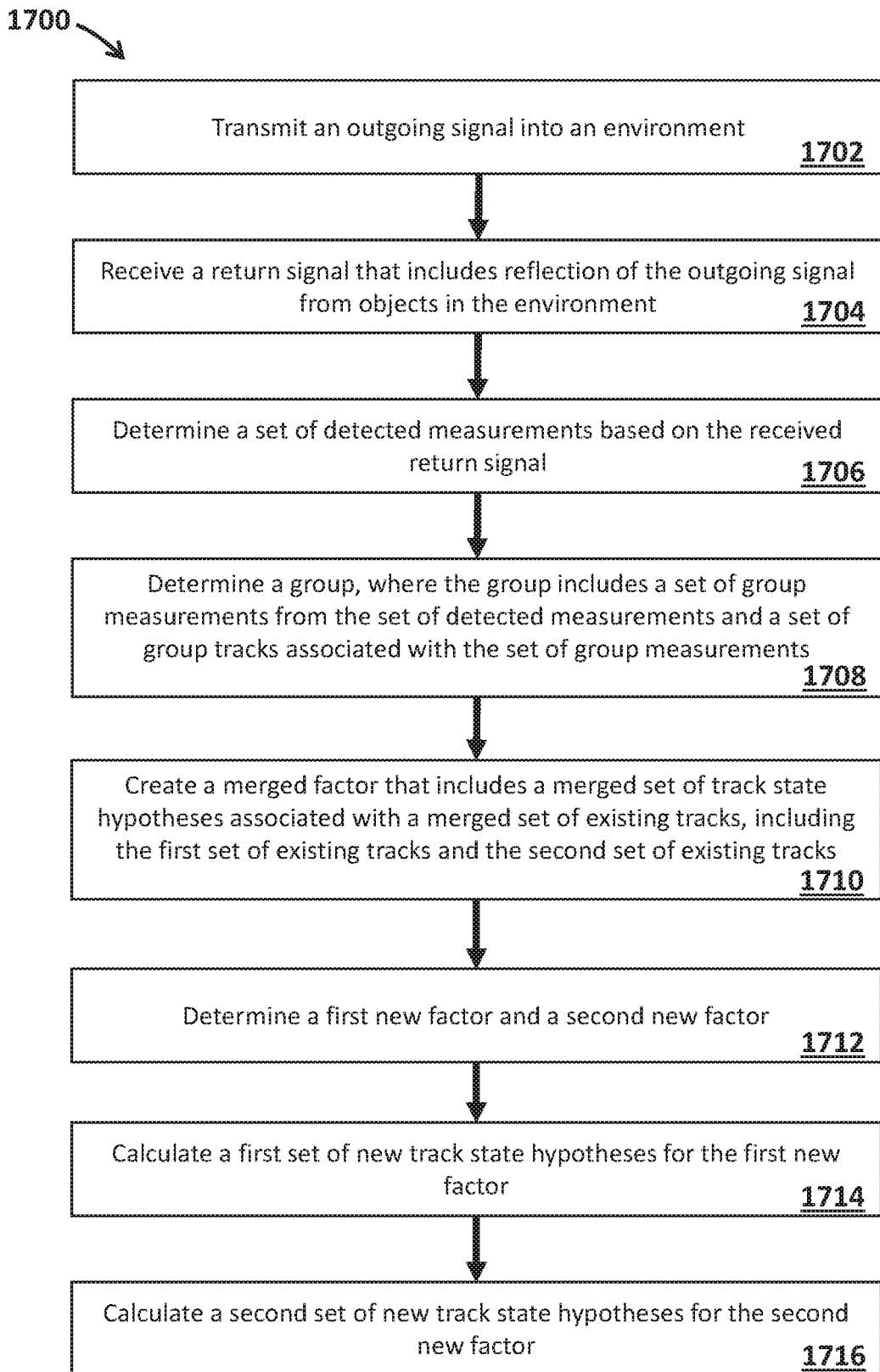
FIG. 17 is a flow chart of an example process for detecting objects in the environment and tracking the objects, according to some embodiments.

FIG. 17 is a flow chart of an example process 1700 for detecting objects in the environment and filtering the data from the detected objects to track the objects. For convenience, the process 1700 will be described as being performed by a system of one or more computers located in one or more locations. For example, the AV system 120 of FIG. 1 (or portions thereof), appropriately programmed in accordance with this specification, can perform the process 1700.

At block 1702, the system (e.g., AV system 120) transmits an outgoing signal (e.g., RADAR data or light 604a-c) into an environment (e.g., environment 190). In some embodiments, the outgoing signal is a RADAR, LiDAR, or ultrasonic signal.

At block 1704, the system receives a return signal that includes reflection of the outgoing signal from objects (e.g., natural obstructions 191, vehicles 193, pedestrians 192, cyclists, and other objects) in the environment.

At block 1706, the system determines a set of detected measurements based on the received return signal, where the detected measurements corresponding to respective detections of objects in the environment.

At block 1708, the system determines a group, where the group includes a set of group measurements from the set of detected measurements (e.g., a subset of all the measurements that meet gating criteria) and a set of group tracks associated with the set of group measurements. In some embodiments, the group is a set of tracks and measurements that are associated either directly or indirectly (e.g., measurement m1 and track trk3 are in the same group if measurements m1 and m2 gate with trk1 and m2 also gates with trk3, even if m1 does not gate with trk3). The set of group tracks includes a first track associated with a first previous factor and a second track associated with a second previous factor (e.g., the group includes tracks from different factors). The first previous factor includes a first set of previous track state hypotheses associated with a first set of existing tracks, including the first track. In some embodiments, the set of tracks included in the hypotheses of the first previous factor is different than the tracks included in the group. The second previous factor includes a second set of previous track state hypotheses associated with a second set of existing tracks, including the second track. In some embodiments, the set of tracks included in the hypotheses of the second previous factor is different than the tracks included in the group. In some embodiments, the tracks associated with the first previous factor and the tracks associated with the second previous factor are mutually exclusive. In some embodiments, the track state hypotheses of the first previous factor and the second previous factor are mutually exclusive.

In some embodiments, determining the group that includes the set of group measurements and the set of group tracks includes determining that measurements in the set of group measurements meet gating criteria based on a state (e.g., estimate of position and/or velocity) of at least one track in the set of group tracks. In some embodiments, a gating function (e.g., a coarse gating function) is defined that determines whether a measurement can be associated to a track ID, or to another measurement. In some embodiments, since measurement time stamps can be different, gating parameters consider other parameters, such as maximum speed. In some embodiments, uncertainty is taken into account, though not necessarily through matrix inversion. The same track can be present in more than one hypothesis. In some embodiments, if a group has only a track but no gated measurements, the group is ignored. In some embodiments, if a group has a set of measurements (e.g., measurements that gate among themselves) but no gated tracks, a new factor is created and associated with the set of measurements. In some embodiments, if a group has both measurements and gated tracks, since the tracks can be present in different factors, further partitioning is performed to determine how update should be done.

In some embodiments, the group includes a set of factors with corresponding track state hypotheses, where the set of factors includes the first previous factor and the second previous factor. In some such embodiments, determining the group includes: determining that at least one track state hypothesis in the first set of previous track state hypotheses of the first previous factor includes at least one track in the set of group tracks; and determining that at least one track state hypothesis in the second set of previous track state hypotheses of the second previous factor includes at least one track in the set of group tracks. For example, in some embodiments, a measurement-track group gates with a factor if any track contained in the measurement-track group is present in any hypothesis in the factor. In some embodiments, if the group contains factors but no gated measurement groups, it is ignored; otherwise, the system considers whether merging and splitting should be performed as follows. If the group contains measurement groups but no gated factors, then a new factor is created and associated with the measurements. If the group contains measurement groups and factors, then: (a) if there is only one factor, then merging is not performed; and (b) if there is more than one factor, the factors are merged.

In some embodiments, the system performs marginalization over a remote history. For example, in some embodiments, the system determines a weight of a first track state hypothesis of the first set of previous track state hypotheses by combining a weight of a second track state hypothesis and a weight of a third track state hypothesis. In some embodiments, the system determines the weight of the first track state hypothesis by combining the weight of the second track state hypothesis with the weight of the third track state hypothesis in accordance with a determination that a history of the second track state hypothesis and a history of the third track state hypothesis are the same at each frame of measurements over a predetermined number of frames of measurements immediately preceding a current frame of measurements. In some embodiments, for each hypothesis, the pedigree of the hypothesis can be traced to a root in a hypothesis tree (e.g., FIGS. 15A-15B). In some embodiments, if pedigree is truncated to a length of L, then two hypotheses may have pedigrees with an identical pedigree of length L. In this case, the system ignores earlier history and considers these two hypotheses to be identical, and keeps only one hypothesis (and deletes the other). The weight of the hypothesis that is going to be deleted is add to the weight of the hypothesis that is kept.

At block 1710, the system creates a merged factor that includes a merged set of track state hypotheses associated with a merged set of existing tracks, including the first set of existing tracks and the second set of existing tracks (e.g., the merged set of existing tracks consists of the first set of existing tracks and the second set of existing tracks). In some embodiments, the system creates the merged factor by calculating the cross-product of the first set of previous track state hypotheses and the second set of previous track state hypotheses.

In some embodiments, the merged set of track state hypotheses is trimmed based on trimming criteria, e.g., in order to reduce computational burden. For example, the cross-product of the first set of previous track state hypotheses and the second set of previous track state hypotheses is trimmed to keep only the top K hypotheses.

In some embodiments, creating the merged set of track state hypotheses includes using a K-shortest path algorithm to select the merged set of track state hypotheses from a larger set of track state hypotheses. For example, given a set of factors, the system enumerates the "top K" weighted cross products of the hypotheses included in the factors, and creates one new hypothesis for each product by concatenating the component tracks and multiplying the component weights. In some embodiments, the weights of the remaining hypotheses are renormalized. In some embodiments, after truncating, the system collects all track IDs and all gated track IDs involved in the remaining hypotheses, and if the set difference is not empty, then the system determines whether to perform splitting.

At block 1712, the system determines a first new factor and a second new factor (e.g., the merged factor is split into two or more new factors). In some embodiments, the system determines a first new factor and a second new factor in accordance with a determination that the merged factor satisfies a splitting condition. In some embodiments, the splitting condition is based on the set of group measurements (e.g., the set of measurements that met gating criteria), the first set of existing tracks (e.g., the tracks associated with the first previous factor), and the second set of existing tracks (e.g., the tracks associated with the second previous factor).

In some embodiments, the first new factor is associated with a first subset of the group measurements and a first subset of the merged set of existing tracks. In some embodiments, the first subset of the merged set of existing tracks includes at least one track from the first set of existing tracks from the first previous factor and at least one track from the second set of existing tracks from the second previous factor. In some embodiments, the first new factor includes a third set of previous track state hypotheses that includes at least one hypothesis from the first set of previous track state hypotheses from the first previous factor and at least one hypothesis from the second set of previous track state hypotheses from the second previous factor.

In some embodiments, the second new factor is associated with a second subset of the group measurements and a second subset of the merged set of existing tracks. In some embodiments, the second subset of the merged set of existing tracks includes at least one track from the first set of existing tracks from the first previous factor and at least one track from the second set of existing tracks from the second previous factor. In some embodiments, the second new factor includes a fourth set of previous track state hypotheses that includes at least one hypothesis from the first set of previous track state hypotheses from the first previous factor and at least one hypothesis from the second set of previous track state hypotheses from the second previous factor.

In some embodiments, the first subset of the group measurements and the second subset of the group measurements are mutually exclusive. In some embodiments, the first subset of the merged set of existing tracks and the second subset of the set of existing tracks are mutually exclusive.

In some embodiments, determining the first new factor and the second new factor is performed in accordance with a determination that differences between weights of the merged set of track state hypotheses (e.g., the joint probabilities) and corresponding products of weights of the first set of previous track state hypotheses and weights of the second set of previous track state hypotheses (e.g., the product of the marginal hypotheses) are less than or equal to a predetermined threshold. For example, when targets are relatively far away from each other, the total distribution of the tracks associated with the targets can be approximated by the product of the marginal probabilities, where the product operation is carried out by enumerating combinations of hypotheses from each marginal hypothesis. A vector norm of the difference in weights between the original and the reconstructed distributions can be used as an indicator of the quality of the approximation.

In some embodiments, after the system determines the first new factor and the second new factor, the system updates the hypotheses in each new factor separately, e.g., as if they are statistically independent. At block 1714, the system calculates a first set of new track state hypotheses for the first new factor based on the first subset of the group measurements (e.g., the system updates the previous hypotheses based on the new measurements associated with the first new factor; calculate new weights and/or estimated track states for the hypotheses). At block 1716, the system calculates a second set of new track state hypotheses for the second new factor based on the second subset of the group measurements (e.g., update the previous hypotheses based on the new measurements associated with the second new factor; calculate new weights and/or estimated track states for the hypotheses).

In some embodiments, calculating the first set of new track state hypotheses and calculating the second set of new track state hypotheses is performed using a 8-Generalized Labeled Multi-Bernoulli filter. In some embodiments, the 8-Generalized Labeled Multi-Bernoulli filter enumerates top ranked hypotheses, and a computation budget is set in terms of the total number of hypotheses to keep in memory.

In the foregoing description, embodiments have been described with reference to numerous specific details that may vary from implementation to implementation. The description and drawings are, accordingly, to be regarded in an illustrative rather than a restrictive sense. The sole and exclusive indicator of the scope of the claims, and what is intended by the applicants to be the scope of the claims, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when the term "further comprising" is used in the foregoing description or following claims, what follows this phrase can be an additional step or entity, or a sub-step/sub-entity of a previously-recited step or entity.

What is claimed is:

1. A non-transitory computer-readable storage medium storing instructions which, when executed by one or more computing devices, cause performance of operations comprising:
   obtaining a plurality of factors, each of the factors including a set of hypotheses, each hypothesis of the set of hypotheses including a set of tracks, and each track of the set of tracks corresponding to an object in an environment;
   receiving a signal indicative of at least one object in the environment;
   determining a set of measurements of the at least one object based on the signal;
   associating at least one measurement of the set of measurements with at least two of the plurality of factors;
   merging the at least two of the plurality of factors into a merged factor, wherein the merged factor includes a merged set of tracks from the at least two factors and a merged set of measurements from the at least two factors;
   in accordance with a determination that the merged factor satisfies a splitting condition, splitting the merged factor into a first split factor and a second split factor, wherein:
      the first split factor is associated with a first subset of the merged set of measurements and a first subset of the merged set of tracks;
      the second split factor is associated with a second subset of the merged set of measurements and a second subset of the merged set of tracks;
      the first subset of the merged set of measurements and the second subset of the merged set of measurements are mutually exclusive; and
      the first subset of the merged set of tracks and the second subset of the merged set of tracks are mutually exclusive;
   tracking the at least one object in the environment based on the first subset of the merged set of tracks of the first split factor and the second subset of the merged set of tracks of the second split factor; and
   causing an autonomous vehicle to navigate the environment based on the tracked at least one object.

2. The non-transitory computer-readable storage medium of claim 1, further storing instructions which, when executed by one or more computing devices, cause performance of operations comprising:
   transmitting an outgoing signal into the environment; and
   receiving a return signal including the signal indicative of the at least one object, wherein the return signal includes a reflection of the outgoing signal from the at least one object.

3. The non-transitory computer-readable storage medium of claim 2, wherein the outgoing signal is a RADAR, LiDAR, or ultrasonic signal.

4. The non-transitory computer-readable storage medium of claim 1, further storing instructions which, when executed by one or more computing devices, cause performance of operations comprising:
   determining a track-measurement group that includes a set of group measurements from the set of measurements and a set of group tracks associated with the set of group measurements, wherein the set of group tracks includes:

a first track of the set of tracks associated with a first previous factor of the plurality of factors, the first previous factor including a first set of previous hypotheses, the first set of previous hypotheses associated with a first set of existing tracks that includes the first track; and a second track of the set of tracks associated with a second previous factor of the plurality of factors, the second previous factor including a second set of previous hypotheses, the second set of previous hypotheses associated with a second set of existing tracks that includes the second track.

5. The non-transitory computer-readable storage medium of claim 4, wherein the merged factor further includes a merged set of hypotheses associated with the merged set of tracks, the merged set of tracks including the first set of existing tracks and the second set of existing tracks.

6. The non-transitory computer-readable storage medium of claim 5, wherein determining the first split factor and the second split factor is performed in accordance with a determination that differences between weights of the merged set of hypotheses and corresponding products of weights of the first set of previous hypotheses and weights of the second set of previous hypotheses are less than or equal to a predetermined threshold.

7. The non-transitory computer-readable storage medium of claim 4, wherein merging the at least two of the plurality of factors into the merged factor comprises calculating a cross-product of the first set of previous hypotheses and the second set of previous hypotheses.

8. The non-transitory computer-readable storage medium of claim 1, further storing instructions which, when executed by one or more computing devices, cause performance of operations comprising:

calculating a first set of updated hypotheses for the first split factor based on the first subset of the merged set of measurements; and calculating a second set of updated hypotheses for the second split factor based on the second subset of the merged set of measurements;

wherein tracking the at least one object in the environment is further based on the first set of updated hypotheses and the second set of updated hypotheses.

9. A system comprising:
one or more computer processors; and
memory storing instructions which, when executed by the one or more computer processors, cause performance of operations comprising:
obtaining a plurality of factors, each of the factors including a set of hypotheses, each hypothesis of the set of hypotheses including a set of tracks, and each track of the set of tracks corresponding to an object in an environment;
receiving a signal indicative of at least one object in the environment;
determining a set of measurements of the at least one object based on the signal;
associating at least one measurement of the set of measurements with at least two of the plurality of factors;
merging the at least two of the plurality of factors into a merged factor, wherein the merged factor includes a merged set of tracks from the at least two factors and a merged set of measurements from the at least two factors;

in accordance with a determination that the merged factor satisfies a splitting condition, splitting the merged factor into a first split factor and a second split factor, wherein:
the first split factor is associated with a first subset of the merged set of measurements and a first subset of the merged set of tracks;
the second split factor is associated with a second subset of the merged set of measurements and a second subset of the merged set of tracks;
the first subset of the merged set of measurements and the second subset of the merged set of measurements are mutually exclusive; and
the first subset of the merged set of tracks and the second subset of the merged set of tracks are mutually exclusive;
tracking the at least one object in the environment based on the first subset of the merged set of tracks of the first split factor and the second subset of the merged set of tracks of the second split factor; and
causing an autonomous vehicle to navigate the environment based on the first split factor and the second split factor.

10. The system of claim 9, wherein the memory further stores instructions which, when executed by one or more computer processors, cause performance of operations comprising:
transmitting an outgoing signal into the environment; and
receiving a return signal including the signal indicative of the at least one object, wherein the return signal includes a reflection of the outgoing signal from the at least one object.

11. The system of claim 10, wherein the outgoing signal is a RADAR, LiDAR, or ultrasonic signal.

12. The system of claim 9, wherein the memory further stores instructions which, when executed by one or more computer processors, cause performance of operations comprising:
determining a track-measurement group that includes a set of group measurements from the set of measurements and a set of group tracks associated with the set of group measurements, wherein the set of group tracks includes:
a first track of the set of tracks associated with a first previous factor of the plurality of factors, the first previous factor including a first set of previous hypotheses, the first set of previous hypotheses associated with a first set of existing tracks that includes the first track; and
a second track of the set of tracks associated with a second previous factor of the plurality of factors, the second previous factor including a second set of previous hypotheses, the second set of previous hypotheses associated with a second set of existing tracks that includes the second track.

13. The system of claim 12, wherein the merged factor further includes a merged set of hypotheses associated with the merged set of tracks, the merged set of tracks including the first set of existing tracks and the second set of existing tracks.

14. The system of claim 13, wherein determining the first split factor and the second split factor is performed in accordance with a determination that differences between weights of the merged set of hypotheses and corresponding products of weights of the first set of previous hypotheses and weights of the second set of previous hypotheses are less than or equal to a predetermined threshold.

15. The system of claim 12, wherein merging the at least two of the plurality of factors into the merged factor comprises calculating a cross-product of the first set of previous hypotheses and the second set of previous hypotheses.

16. The system of claim 9, wherein the memory further stores instructions which, when executed by one or more computer processors, cause performance of operations comprising:
calculating a first set of updated hypotheses for the first split factor based on the first subset of the merged set of measurements; and
calculating a second set of updated hypotheses for the second split factor based on the second subset of the merged set of measurements;
wherein tracking the at least one object in the environment is further based on the first set of updated hypotheses and the second set of updated hypotheses.

17. A method for tracking objects based on a signal received by a sensor, the method comprising:
obtaining, by one or more processors, a plurality of factors, each of the factors including a set of hypotheses, each hypothesis of the set of hypotheses including a set of tracks, and each track of the set of tracks corresponding to an object in an environment;
receiving a signal indicative of at least one object in the environment;
determining a set of measurements of the at least one object based on the signal;
associating at least one measurement of the set of measurements with at least two of the plurality of factors;
merging the at least two of the plurality of factors into a merged factor, wherein the merged factor includes a merged set of tracks from the at least two factors and a merged set of measurements from the at least two factors;
in accordance with a determination that the merged factor satisfies a splitting condition, splitting the merged factor into a first split factor and a second split factor, wherein:
the first split factor is associated with a first subset of the merged set of measurements and a first subset of the merged set of tracks;
the second split factor is associated with a second subset of the merged set of measurements and a second subset of the merged set of tracks;
the first subset of the merged set of measurements and the second subset of the merged set of measurements are mutually exclusive; and
the first subset of the merged set of tracks and the second subset of the merged set of tracks are mutually exclusive;
tracking, by the one or more processors, the at least one object in the environment based on the first subset of the merged set of tracks of the first split factor and the second subset of the merged set of tracks of the second split factor; and
causing, by the one or more processors, an autonomous vehicle to navigate the environment based on the first split factor and the second split factor.

18. The method of claim 17, further comprising:
transmitting an outgoing signal into the environment; and
receiving a return signal including the signal indicative of the at least one object, wherein the return signal includes a reflection of the outgoing signal from the at least one object.

19. The method of claim 18, wherein the outgoing signal is a RADAR, LiDAR, or ultrasonic signal.

20. The method of claim 17, further comprising:
determining a track-measurement group that includes a set of group measurements from the set of measurements and a set of group tracks associated with the set of group measurements, wherein the set of group tracks includes:
a first track of the set of tracks associated with a first previous factor of the plurality of factors, the first previous factor including a first set of previous hypotheses, the first set of previous hypotheses associated with a first set of existing tracks that includes the first track; and
a second track of the set of tracks associated with a second previous factor of the plurality of factors, the second previous factor including a second set of previous hypotheses, the second set of previous hypotheses associated with a second set of existing tracks that includes the second track.

* * * * *